(12) United States Patent
Kobayashi

(10) Patent No.: US 6,256,321 B1
(45) Date of Patent: Jul. 3, 2001

(54) INFORMATION COMMUNICATION NETWORK SYSTEM, CENTRAL INFORMATION COMMUNICATION CONTROL DEVICE AND INFORMATION COMMUNICATION DEVICE USED IN THE SYSTEM, INFORMATION SENDING METHOD, AND MODULATION METHOD

(75) Inventor: Hiroshi Kobayashi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/259,325

(22) Filed: Mar. 1, 1999

Related U.S. Application Data

(63) Continuation of application No. 08/596,865, filed on Feb. 9, 1996.

(30) Foreign Application Priority Data

Feb. 10, 1995 (JP) .................................................. 7-023012
Feb. 5, 1996 (JP) .................................................. 8-018918

(51) Int. Cl.$^7$ ........................................................ H04J 3/16

(52) U.S. Cl. ........................................................... 370/464

(58) Field of Search ................................. 370/464, 442, 370/441, 342, 347, 320, 408, 405, 406, 407, 256, 254, 265, 451, 395, 401, 341, 344, 410, 335, 337, 336, 319, 321, 332, 333, 461, 462; 348/14.11, 14.12; 359/136, 137, 118, 117, 115, 114, 113, 121, 123, 124, 128, 135

(56) References Cited

U.S. PATENT DOCUMENTS 5,724,382 * 3/1998 Gold et al. ............................ 375/295

* cited by examiner

*Primary Examiner*—Dang Ton
(74) *Attorney, Agent, or Firm*—Oblon, Spivak, McClelland, Maier & Neustadt, P.C.

(57) ABSTRACT

An information communication network system, including a plurality of information communication devices to which at least one information device is connected, tree shaped or star shaped bidirectional transmission lines for connecting the information communication devices, and at least one central information communication control device located upward of the bidirectional transmission lines. The central information communication control device includes an access control information generating device, and a downward transmission device. Each of the plurality of information communication devices includes an access control information receiving device, and an information communication control device.

20 Claims, 14 Drawing Sheets

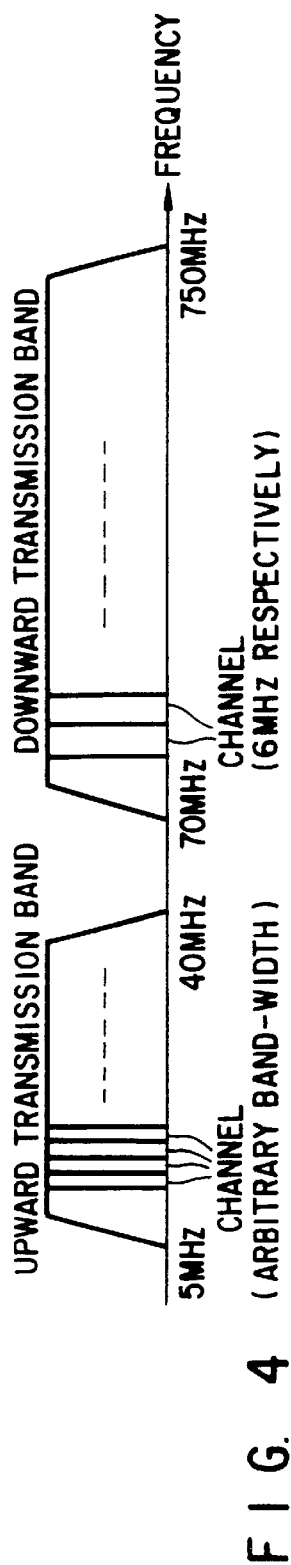
F I G. 4
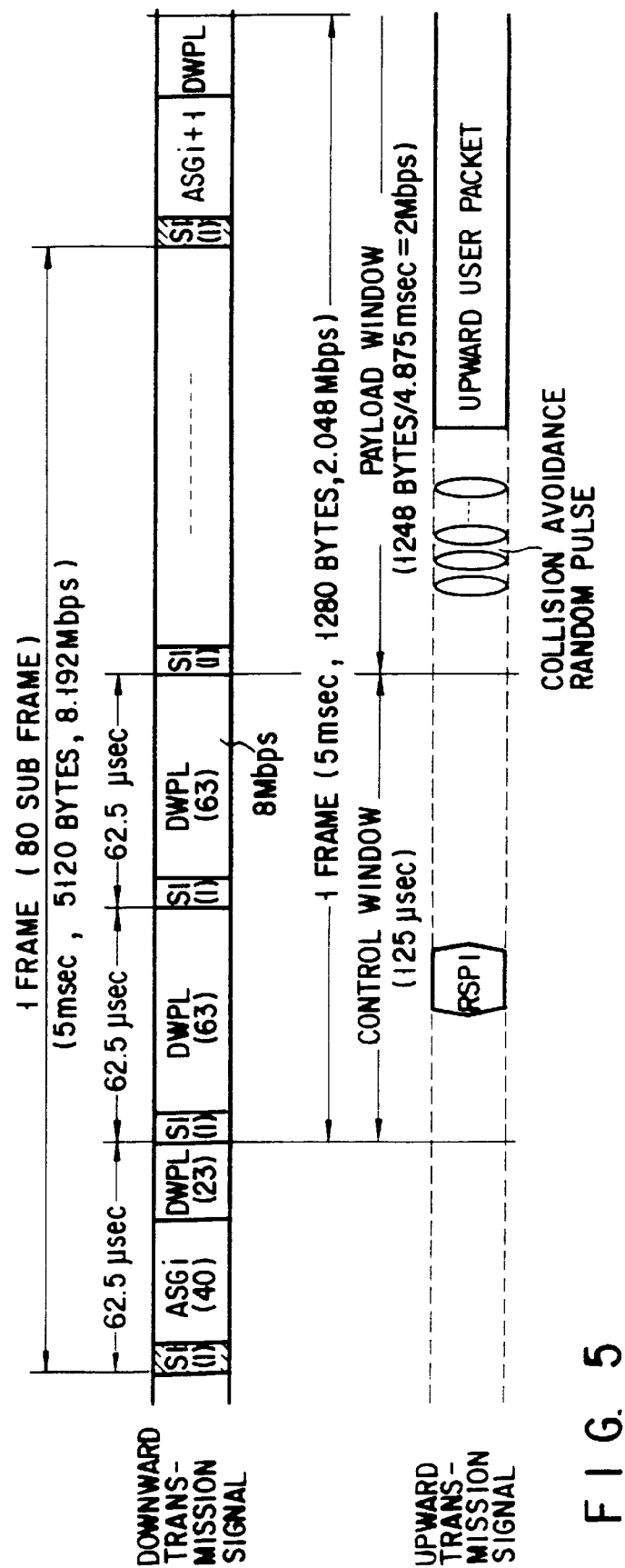
F I G. 5

UPWARD STATUS INDICTOR (SI)

| | |
|---|---|
| 1001 1 1 X X | FRAME SYNCHRONIZATION (CONTROL WINDOW ON) |
| 1001 1 0 X X | FRAME SYNCHRONIZATION (CONTROL WINDOW OFF) |
| 0 1 1 1 1 1 X X | CONTROL WINDOW ON |
| 0 1 1 1 1 0 X X | CONTROL WINDOW OFF |
| 0 1 1 0 0 0 X X | ENABLE CA PULSE TRANSMISSION |
| 0 1 1 0 0 1 X X | DISABLE CA PULSE TRANSMISSION |
| 0 1 1 0 1 0 X X | DETECT CA PULSE |
| 0 1 1 0 1 1 X X | ENABLE CONTINUING SENDING USER PACKET |
| 0 1 1 1 0 0 X X | DETECT USER PACKET |
| 0 1 1 1 0 1 X X | START CA SEQUENCE |

XX : ERROR CHECK CODE

F I G. 6

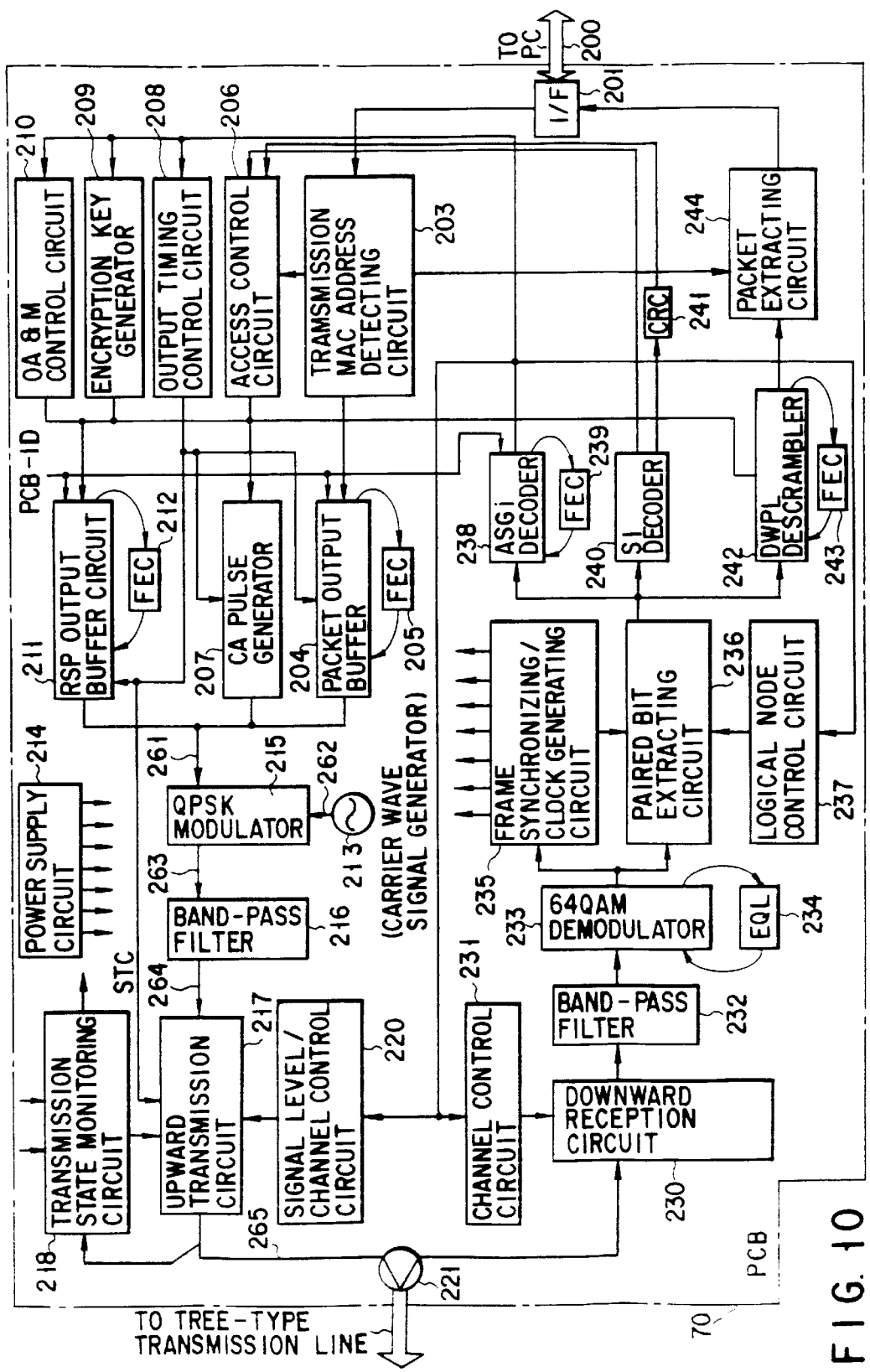
F I G. 10

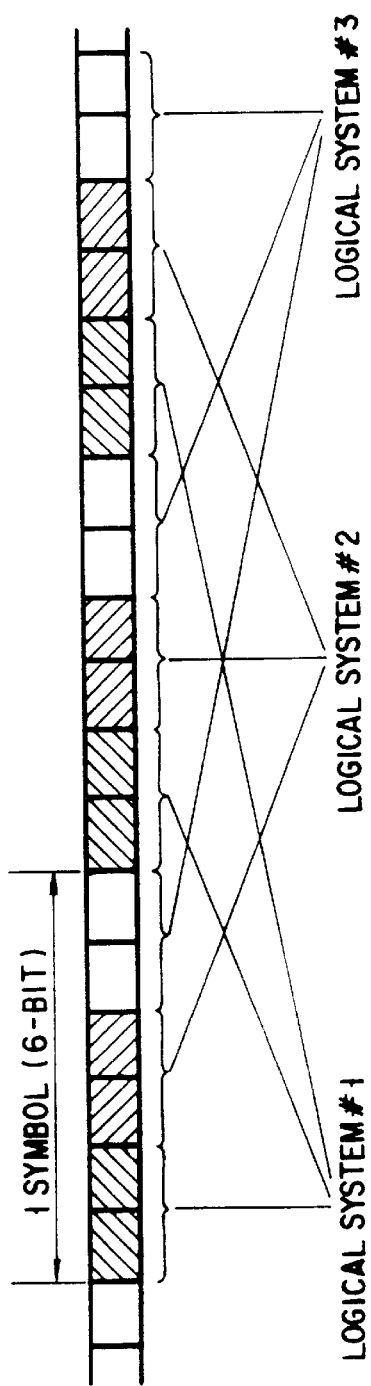
F I G. 11
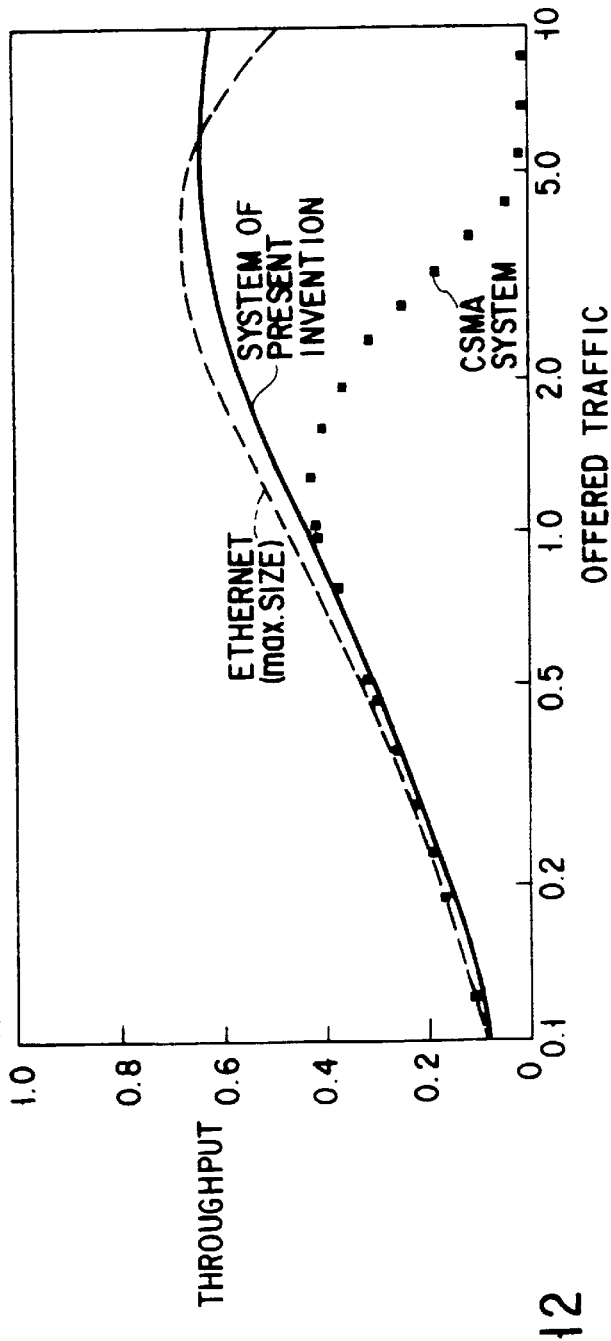
F I G. 12

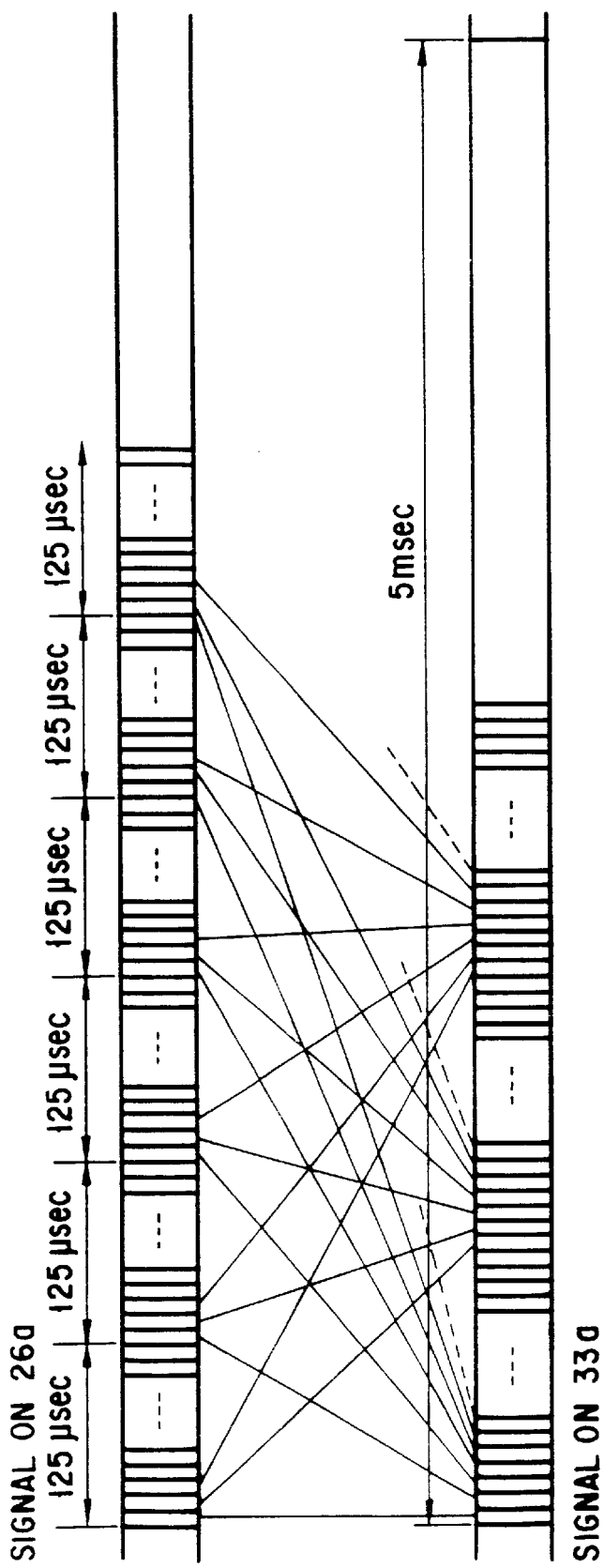
F I G. 14

INFORMATION COMMUNICATION NETWORK SYSTEM, CENTRAL INFORMATION COMMUNICATION CONTROL DEVICE AND INFORMATION COMMUNICATION DEVICE USED IN THE SYSTEM, INFORMATION SENDING METHOD, AND MODULATION METHOD

This application is a continuation of 08/596,865 Feb. 9, 1996.

BACKGROUND OF THE INVENTION

1. Field of the Invention

The present invention relates to an information communication network system built on a tree shaped information communication network represented by a bidirectional CATV or a star shaped information communication network represented by an optical fiber system network (also called "FTTH" (fiber to the home)) in order to simultaneously accomplish a connection-less high speed information communication network service and/or also a connection oriented type telephone and data service similar to LAN (Local Area Network), a central information communication control device and information communication terminals both used in this information communication network system, in addition, an information transmission method and modulation method.

2. Description of the Related Art

The recent popularity of personal computers (hereinafter simply called "computers" or "PC") is very remarkable. The use of those computers is rapidly expanding to high-grade information communication services such as a so-called PC on-line service and Internet, not mentioning their traditional usage as individual computer units. The currently available means for connecting general subscribers to such a PC on-line service and Internet is only a connection oriented type analog telephone line or a narrow-band ISDN digital line. The analog telephone line can merely provide a service at a transmission rate of 2.4 kbps to 28.8 kbps via modems, while the narrow-band ISDN can merely provide a service at a transmission rate of 16 kbps or 64 kbps. This limitation is becoming a big bottleneck in receiving or enjoying high-grade information communication services such as accessing via a network to information like documents using multimedia technology that is recently advancing remarkably.

In a limited range of usage within buildings or in a LAN, high speed information communication at a rate of 10 Mbps or faster using a connection-less LAN is available so that such information communication has become popular from large-sized companies to small or medium-sized firms. There is however no specific means which allows a connection-less high speed information communication service corresponding to LAN to be used as one of public information communication services in home, and the development and practical usage of such specific means are strongly demanded.

To realize a connection-less high speed information communication service as one public information communication service at a low cost, it is essential to more properly and efficiently provide communication resources needed for the service. In view of the recent noticeable development of server-client systems, it is typical that a client computer retrieves information stored in a server. In this case, it should be noted that the communication is asymmetrical transmission wherein the amount of information transferred downward to a client computer from the server is far greater than the amount of information transferred upward to the server from the client computer. In the Ethernet which is a typical type of LAN, for example, information transmitted from one terminal is sent to all the terminals. If this transmission system is directly used as a public information communication service, information on an upward transmission line which has been transmitted from a client is transmitted directly on downward transmission lines. This system wastes the communication resources of the downward transmission line accordingly. This means that the technology cultivated in the LAN field cannot be adapted directly to public information communication services.

Access system networks, which can utilize high speed information communication services at a transmission rate of 10 Mbps or faster as public information communication services, include a so-called CATV network which is very popular in the U.S.A. and is expected to become popular in Japan too, an HFC (hybrid fiber and coaxial) which is realized by replacing a part of this CATV network with an optical fiber system, and an optical fiber system network (FTTH: fiber to the home) which is expected to be put to a practical use soon. The technologies that can be adapted to those networks are important in quickly accomplishing the mentioned services.

What is common to those networks is the use of tree shaped or star shaped bidirectional transmission lines separated to upward transmission lines and downward transmission lines (lines may be separated physically or the same line may be separated by frequencies or wavelengths) as shown in FIGS. 1 and 2. It is also important that the technologies should consider the performances of those transmission types.

If a connection oriented type telephone and data service can be provided at the same time as the aforementioned connection-less service is accomplished, a business firm who intends to present those services can increase the number of computer communication users and the number of telephone users without double investments. It can therefore be expected that users can receive both transmission services at lower costs and that a new service rendered by computers linked to telephones, such as users making a telephone communication while seeing the same information through computers.

To provide a connection-less high speed information communication service in a tree shaped or star shaped network, various matters should be dealt with, such as fairness, no lost packet, high speed and high throughput, upward ingress noise, poor quality of downward transmission, long network length and information leakage.

The "fairness" is to give a fair transmission permission to computers as information communication terminals wherever they are located in a network. In a contention system as CSMA/CD (carrier sense multiple access with collision detection) that is used in the Ethernet, for example, the following case may occur when the levels of collided signals differ significantly from each other in a predetermined access control method. When high-level signals collide, the collision is not detected and a packet will properly reach the destination undestroyed by the collision. When low-level signals collide, on the other hand, the collision is detected or a packet is destroyed and a computer tries a resend so that it becomes difficult to obtain the transmission permission. The difference between those signal levels is caused by the position of connection of a computer to the transmission line or the chronological change in the output device even if the levels of signal output from that computer are equal. A computer connected to the position of a large attenuation or a computer whose output signals have attenuated levels due to the chronological change in the output device is disadvantageous over other computers.

The "lost packet" may occur when a received packet contains many bit errors so that the sender address cannot be discriminated and the receiver cannot request the sender to resend the packet. More specifically, the sender tries a resend if there is no response from the receiver when a given time (e.g., 30 seconds) has passed. This phenomenon considerably deteriorates the throughput.

The "high speed and high throughput" indicates, for example, the Ethernet (maximum length of 2.5 km) which has a transmission rate of 10 Mbps and has higher throughput characteristics than the conventional CSMA system. This performance should be exhibited also on a transmission line having a significantly long network length (maximum length of about 15 km or more) like that of CATV.

The "upward ingress noise" is an electromagnetic wave (noise) like private band which occurs upward of a connector provided at the end of a coaxial cable when the connector is open or loose. As such noises occur at individual sections to be mixed together, the noise level increases, thus eventually deteriorating the quality of the upward transmission.

The "poor quality of downward transmission" means that the noise environment associated with the downward transmission becomes poor temporarily or steadily. This phenomenon occurs when cables, etc., on an old established site have been damaged due to the chronological usage so that noise is likely to enter from outside or the noise index of the trunk amplifier for compensating for signal attenuation becomes poor, or if a vast interference source like a radar is located nearby even when cables are new.

The last item, "information leakage," means that there is a possibility of tapping and unauthorized usage of information because the signals to be transmitted (broadcasted) downward are receivable by any computer.

To ensure the simultaneous information transmission and telephone service should face a great technological challenge of accomplishing both connection-less and connection oriented type communication systems, which are quite different in performance, on the same system without impairing their own characteristics.

SUMMARY OF THE INVENTION

Accordingly, it is an object of the present invention to provide an information communication network system, which deals with various expected problems, such as fairness and the maintenance of high throughput between information communication devices, to thereby realize a connection-less high speed information communication network service as a public information communication network system, and which can also ensure a connection oriented type telephone and data service, a central information communication control device and information communication terminals both for use in this information communication network system, an information transmission method and a modulation method.

To achieve the above object, an information communication network system according to one aspect of this invention comprises: a plurality of information communication devices to which at least one information device is connected; tree shaped or star shaped bidirectional transmission lines for connecting the information communication devices; and at least one central information communication control device located upward of the bidirectional transmission lines, wherein the central information communication control device includes access control information generating means for detecting an information communication access state on upward transmission lines in the bidirectional transmission lines and generating information communication access control information for controlling the upward transmission lines, and downward transmission means for transmitting the information communication access control information, produced by the access control information generating means, to downward transmission lines in the bidirectional transmission lines toward the at least one information communication device, and each of the plurality of information communication devices includes access control information receiving means for receiving information communication access control information transmitted from the central information communication control device, and information communication control means for controlling information communication processing of the local information communication device based on the information communication access control information received by the access control information receiving means.

The following are preferred embodiments of the information communication network system embodying this invention.

(1) It is effective that the upward transmission lines bidirectional transmission lines are separated from the downward transmission lines of the bidirectional transmission lines, and the bidirectional transmission lines are separated from the other bidirectional transmission lines or one-directional transmission lines, by frequency division multiplexing or wavelength division multiplexing. Alternatively, it is effective that the bidirectional transmission lines are asymmetrical transmission lines whose downward transmission lines can transfer information faster than upward transmission lines. In addition, in the asymmetrical transmission line, transmission speed ratio of the downward and upward transmission lines is set based on a hypothesis traffic ratio of downward and upward transmission lines and respective hypothesis effective throughput of downward and upward transmission lines.

(2) The access control information generating means generates information communication access control information including at least one of information indicating if information transmission is performed on an upward transmission line and information indicating if information transmission from at least one information communication device suffers a contention on an upward transmission line. In this case, it is preferable that the access control information generating means should measure at least one of a propagation delay time with respect to an information communication device and a reception level of an upward transmission signal from an information communication device, and should generate the information communication access control information based on a measuring result.

In an information communication network system comprising a plurality of information communication devices to which at least one information device is connected, tree shaped or star shaped bidirectional transmission lines for connecting the information communication devices, and at least one central information communication control device located upward of the bidirectional transmission lines, the central information communication control device embodying this invention comprises: access control information generating means for detecting an information communication access state on upward transmission lines in the bidirectional transmission lines and generating information communication access control information for controlling the upward transmission lines; and downward transmission means for transmitting the information communication access control information, produced by the access control information generating means, to downward transmission lines in the bidirectional transmission lines toward the at least one information communication device.

It is effective that the downward transmission means includes modulation means for modulating symbols each consisting of a bit sequence of a predetermined length, and the modulation means includes means for assigning a plurality of framed logic systems to predetermined bit groups, means for preparing a symbol from a set of the bit groups, and means for modulating the prepared symbols. In this case, the predetermined bit sequence is a set of the predetermined bit groups. Further, the information network system further comprises managing means for managing the network, and the modulation means includes means for selecting a length of a bit sequence constituting the symbol in accordance with a transmission line quality and an operation of the managing means. Alternatively, the modulation means includes means for adaptively selecting a length of a bit sequence constituting the symbol in accordance with a transmission line quality and an operation of the managing means.

In an information communication network system comprising a plurality of information communication devices to which at least one information device is connected, tree shaped or star shaped bidirectional transmission lines for connecting the information communication devices, and at least one central information communication control device located upward of the bidirectional transmission lines and having means for detecting an information communication access state on upward transmission lines in the bidirectional transmission lines to generate information communication access control information for controlling the upward transmission lines, and transmitting the generated information communication access control information downward transmission lines in the bidirectional transmission lines, each of the information communication devices comprises: access control information receiving means for receiving information communication access control information transmitted from the central information communication control device; and information communication control means for controlling information communication processing based on the information communication access control information received by the access control information receiving means.

In an information communication network system including a plurality of information communication devices to which at least one information device is connected, tree shaped or star shaped bidirectional transmission lines for connecting the information communication devices, and at least one central information communication control device located upward of the bidirectional transmission lines, an information transmission method for executing information transmission between the central information communication control device and at least one of the information communication devices, comprises: a first step of detecting at least one of a propagation delay time with respect to an information communication device and a reception level of an upward transmission signal from an information communication device; a second step of generating information communication access control information based on a result of detection performed in the first step and transmitting the information communication access control information to an associated information communication device; and a third step of receiving the information communication access control information, transmitted in the second step, at the associated information communication device, and controlling information communication processing based on the received information communication access control information.

An information communication network system according to another aspect of this invention comprises: tree shaped or star shaped bidirectional transmission lines including upward transmission lines having a predetermined transmission rate and downward transmission lines having a higher transmission rate than the upward transmission lines; a plurality of information communication devices which are connected to the bidirectional transmission lines and to each of which a connection-less information device is connected; and a central information communication control device which is located upward of the bidirectional transmission lines and to which at least one connection-less information processing device is connected directly or via another transmission line or another communication device, wherein information transmitted from the connection-less information device is essentially transmitted in the upward transmission lines, and information transmitted from the connection-less information processing device is essentially transmitted in the downward transmission lines.

An information communication network system according to a further aspect of this invention comprises: tree shaped or star shaped bidirectional transmission lines including upward transmission lines having a predetermined transmission rate and downward transmission lines having a higher transmission rate than the upward transmission lines; a plurality of information communication devices which are connected to the bidirectional transmission lines and to each of which at least one of an information device for performing connection-less communication, an information device for performing connection oriented type communication, and a communication device is connected; and a central information communication control device to which at least one connection-less information processing device, located upward of the bidirectional transmission lines, and a connection oriented type switching device are connected directly or via another transmission lines or another communication devices, connection-less information and connection oriented type information are transmitted in a mixed form on the upward transmission lines and the downward transmission lines.

According to this invention, there is provided a modulation method for modulating symbols each consisting of a bit sequence of a predetermined length, which comprises the steps of: assigning a plurality of framed logic systems to predetermined bit groups; preparing a symbol from a set of the bit groups; and modulating the prepared symbols.

According to this invention, the information communication device causes the central information communication control device to perform upward information communication control of this information communication device in accordance with information communication access control information produced based on the information communication access state on an upward transmission line in bidirectional transmission lines. Therefore, signal transmission is executed between individual information communication devices and the central information communication control device under the optimal conditions in view of the conditions of the transmission lines, e.g., the physical conditions of the transmission lines, such as propagation loss and propagation delay time, and the usage conditions of the transmission lines like the presence or absence of collision. Because fairness between individual information communication devices is maintained and transmission with a high signal to noise ratio is possible, therefore, the influence of ingress noise is reduced and the packet loss is suppressed. This feature can accomplish not only connection-less information transmission but also connection oriented type information transmission at the same time.

In the information communication network system according to this invention, the central information communication control device includes access control information generating means and downward transmission means. The access control information generating means detects an information communication access state on upward transmission lines in the bidirectional transmission lines and generates information communication access control information for controlling the upward transmission lines based on the detection result, and this produced information communication access control information is transmitted to downward transmission lines in the bidirectional transmission lines toward the at least one information communication device. At least one information communication device includes access control information receiving means and information communication control means. This access control information receiving means receives information communication access control information transmitted from the central information communication control device, and the information communication control means controls information communication processing of the local information communication device based on this received information communication access control information.

Further, the modulation system in use modulates symbols each consisting of a bit sequence of a predetermined length. This modulation system assigns a plurality of framed logic systems to predetermined bit groups, prepares a symbol from a set of the bit groups, and modulates the prepared symbols. This modulation system can allow the system structure to become simpler and can permit the number of multiplexing stages for transmission signals to be easily altered without significantly changing the system structure.

In short, this invention can provide an information communication network system, which deals with various expected problems, such as fairness and the maintenance of high throughput between information communication devices, to thereby realize a connection-less high speed information communication network service and a connection oriented type telephone service on a public information communication network, a central information communication control device and information communication terminals both for use in this information communication network system, and an information transmission method.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 is a diagram showing the structure of a transmission band in tree shaped transmission lines in the system shown in FIG. 3;

FIG. 5 is a diagram showing the transmission formats of a downward transmission signal and an upward transmission signal in the system shown in FIG. 3;

FIG. 6 is a diagram showing an upward access function of a status indicator;

FIG. 10 is a circuit block diagram showing the structure of an information communication device (PCB) in the system shown in FIG. 3;

FIG. 11 is a diagram showing a signal transmission system by a 64QAM modulation system;

FIG. 12 is a throughput characteristic diagram for explaining the advantages of the first embodiment of this invention;

FIG. 14 is a diagram showing multiplexed signal conversion in the system shown in FIG. 13;

DETAILED DESCRIPTION OF THE PREFERRED EMBODIMENTS

Preferred embodiments of the present invention will now be described referring to the accompanying drawings.

Figure 1:
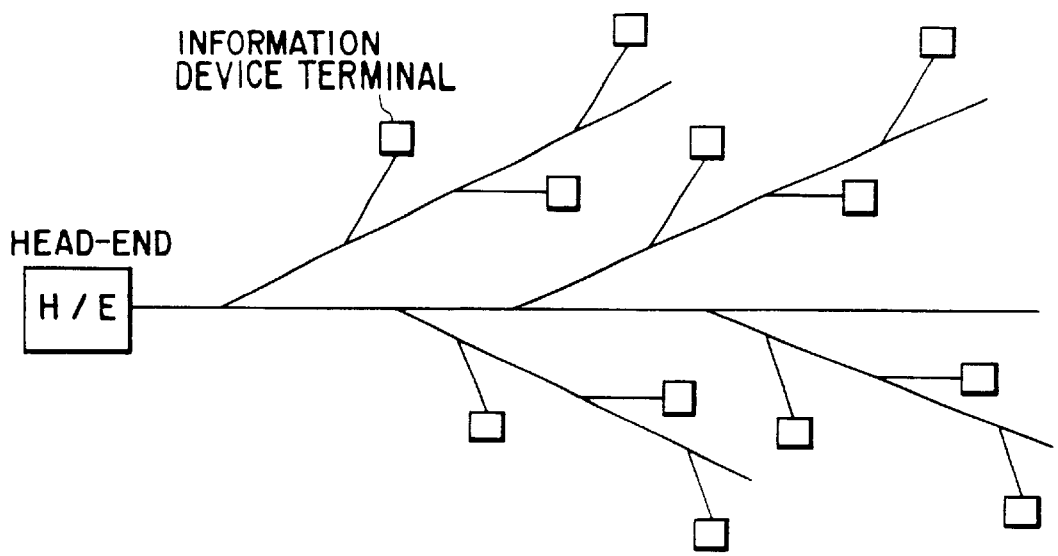
FIG. 1 is a diagram exemplifying a network system which uses tree shaped transmission lines.
Figure 2:
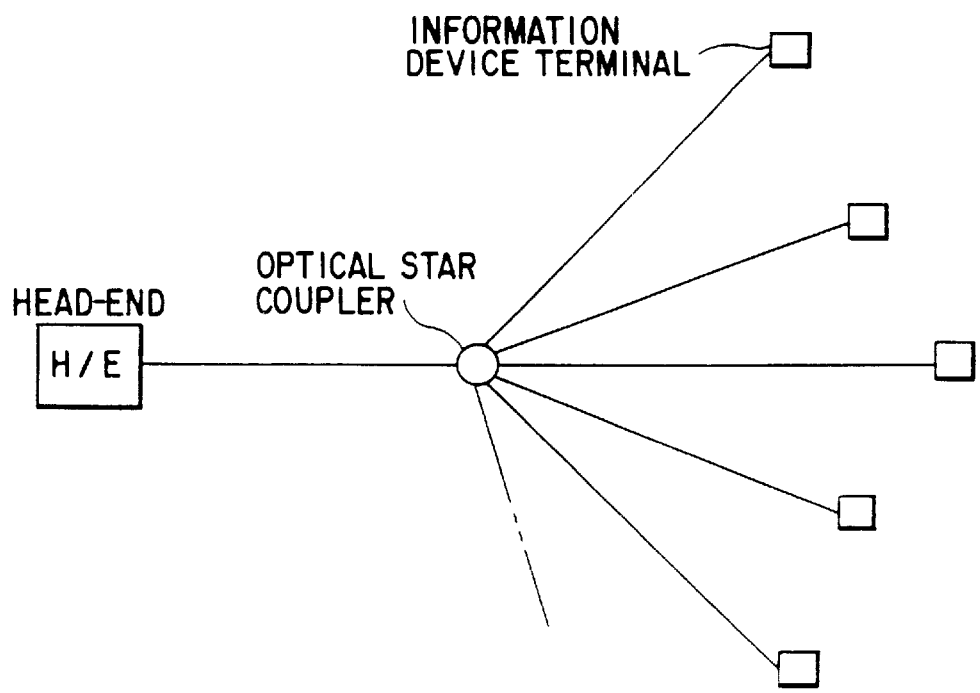
FIG. 2 is a diagram exemplifying a network system which uses star shaped transmission lines.
Figure 3:
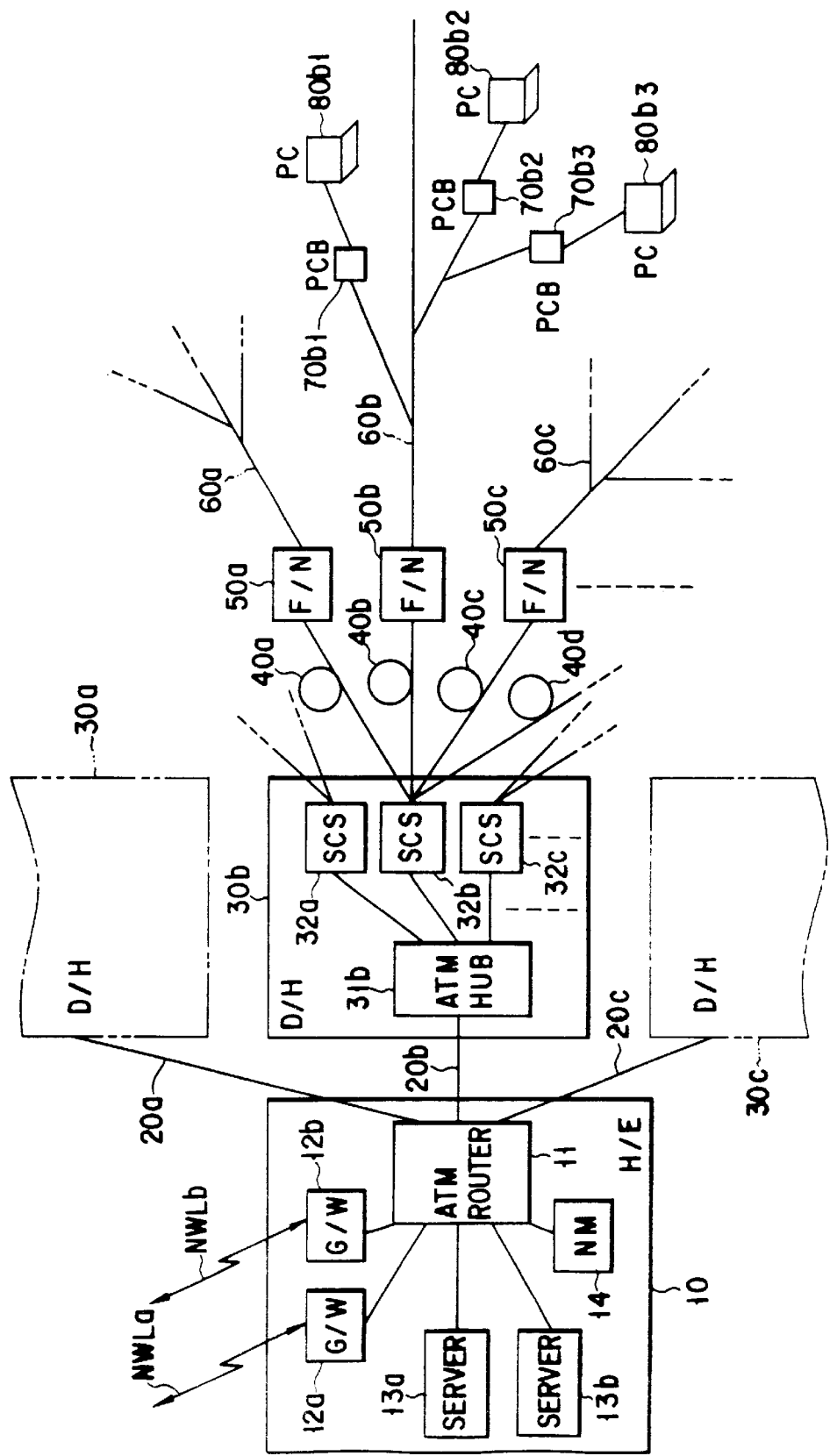
FIG. 3 is a schematic structural diagram of a CATV network system according to the first embodiment of this invention.

FIG. 3 shows the schematic structure of a system according to the first embodiment of this invention, which can ensure computer-aided information communication using a CATV network system. The illustration of the intrinsic functions and facility of a CATV like a TV broadcasting service is omitted in FIG. 3 to avoid the diagrammatic complication.

The CATV network system according to this embodiment comprises a head-end (H/E) 10, a plurality of distribution hubs (D/H) 30a to 30c, connected to this head-end 10 via lines 20a to 20c, a plurality of fiber nodes (F/N) 50a, 50b, 50c, . . . , connected to those distribution hubs 30a–30c respectively via optical fiber cables 40a, 40b, 40c, . . . , and so forth, and tree shaped transmission lines 60a, 60b, 60c, connected to the respective fiber nodes 50a, 50b, 50c and so forth.

Each of the optical fiber cables 40a, 40b, 40c, . . . , consists of a pair of an upward fiber and a downward fiber. Each of the tree shaped transmission lines 60a, 60b, 60c, . . . , consist of a coaxial cable whose end is led into each home. In each home, a converter (not shown) and information communication devices (PCB) 70b1, 70b2, 70b3, . . . , are connected to this coaxial cable, with a TV set and/or a computer (PC) as an information device 80b1, 80b2, 80b3, connected to each of those converters and information communication devices (PCB) 70b1, 70b2, 70b3, As shown in FIG. 4, frequency bands of the tree shaped transmission lines 60a, 60b, 60c, . . . , are separated to upward transmission band (5 MHz to 40 MHz) and downward transmission band (70 MHz to 750 MHz). Further, each of those upward and downward transmission bands is divided to subbands of 6 MHz, which are managed and used as channels. This system is called a "subsplit method." A method in which the upward frequency band is widen to 100 MHz is called a "midsplit method."

The head-end 10 has an asynchronous transfer mode (ATM) switch 11 having a routing function (hereinafter called "ATM router") based on an IP address (an address in the TCP/IP protocol which is internationally popular). Connected to this ATM router 11 are a plurality of gateways (G/W) 12a, 12b, . . . , a plurality of servers 13a, 13b, . . . , and a network management device (NM) 14. The gateways (G/W) 12a, 12b, and so forth connect the local device (local network) to another information communication network system like Internet via lines NWLa, NWLb, and so forth. The servers 13a, 13b and so forth are used when a provider who provides a service like CATV provides an original service like TV shopping or a public bulletin board. The network management device (NW) 14 has a function to perform the network management of the entire system. Packets sent out from the NM 14 are transferred to whichever lines destined via the ATM router 11.

The distribution hubs 30a to 30c respectively have ATM hubs 31a to 31c, with a plurality of central information communication control devices (SCS) connected to each ATM hub. For example, the distribution hub 30b has the ATM hub 31b and a plurality of central information communication control devices (SCS) 32a, 32b, 32c, . . . , connected to the ATM hub. Each of the ATM hubs 31a–31c converts packet information, which are transferred between the lines 20a–20c and the central information communication control devices 32a, 32b, 32c and so forth, to ATM cells, which are in turn multiplexed and distributed. The ATM hubs 31a–31c performs conversion of packet information based on an MAC address described in a packet. Besides an upward access control function to be described later, the central information communication control devices 32a, 32b, 32c, . . . , have a function to convert packets, which are to be transmitted as frequency multiplexed signals on the optical fiber cables 40a, 40b, 40c, . . . , and coaxial cables 60a, 60b, 60c, . . . , to base-band signals, which can be processed by the ATM hub 31b.

Analog signals based on the NTSC system like the aforementioned TV broadcasting are multichannel-multiplexed to downward frequency-multiplexed signals which are sent toward the optical fiber cables 40a, 40b, 40c, . . . , and so forth from the central information communication control devices 32a, 32b, 32c, . . . , and so forth. A laser diode which converts such a frequency-multiplexed signal to an optical signal particularly should have an excellent linear characteristic. Today, such a laser diode is very expensive. Generally, therefore, one laser diode is provided in each central information communication control device 32a, 32b, 32c, . . . , so that a frequency-multiplexed signal output from this single laser diode is transferred to a plurality of optical fiber cables 40a, 40b, 40c, . . . , (i.e., to a plurality of fiber nodes 50a, 50b, 50c, . . . ).

More specifically, in a downward direction, same signals are generally transmitted by bundling about 5 fiber-nodes. In contrast, in an upward direction, different signals are transmitted via each of coaxial cables, fiber-nodes and fiber cables, and optical signals or modulated signals are not directly mixed in the distribution hub. This means the modulated signals are independent for each fiber node, in other word, same frequency channel can be used. This is called as a "frequency re-usage".

The expression "to a plurality of fiber nodes 50a, 50b, 50c, . . . " should not necessarily indicate the fiber nodes 50a, 50b, 50c, . . . , themselves, but may include tree shaped networks formed by the coaxial cables.

Each of the fiber nodes 50a, 50b, 50c, directly converts a downward frequency-multiplexed signal, transferred by associated one of the optical fiber cables 40a, 40b, 40c, . . . , to an electric signal which is in turn transferred to associated one of the tree shaped transmission lines 60a, 60b, 60c, . . . , by the coaxial cables, and directly converts an upward frequency-multiplexed signal, transferred by associated one of the tree shaped transmission lines 60a, 60b, 60c, . . . , to an optical signal which is in turn transferred to associated one of the optical fiber cables 40a, 40b, 40c . . .

Transmission signals used in the above-described system have the following structures.

FIG. 5 shows the transmission formats of the downward transmission signal and upward transmission signal; in this case, the downward transmission signal has a physical transmission rate of 8.192 Mbps and the upward transmission signal has a physical transmission rate of 2.048 Mbps by considering asymmetric of downward and upward traffics in the server-client system as described above. In the case where QPSK (quadrature phase shift keying) is adapted as the modulation method, the occupied bands of the upward transmission signal and downward transmission signal become 6 MHz and 1.5 MHz, respectively.

The downward transmission signal has a frame length of 5120 bytes per 5 msec, and one frame is formed by time division multiplexing of 80 subframes. A status indicator (SI) signal is located at the head of each subframe. This SI signal serves as a frame sync signal and also serves to control the upward access. FIG. 6 exemplifies the upward access function of the SI signal.

In the downward transmission signal, an assignment (ASGi) signal directly follows the frame sync signal SI. The ASGi signal is used to execute propagation delay time control, signal level control and OA&M (Operation, Administration and Management) function in cooperation of a response (RSPi) signal which is one type of upward transmission signal. Following the ASGi signal is a payload container (DWPL) which transfers a downward packet while sandwiching an SI signal with a DWPL of a subsequent subframe. This DWPL is capable of transferring information at a rate of 8 Mbps.

The upward transmission signals are separated to an area called a "control window" and an area called "payload window." The control window is used to transmit the response (RSPi) signal. The payload window is used to transmit a collision avoidance random pulse and an upward user packet.

Figure 7:
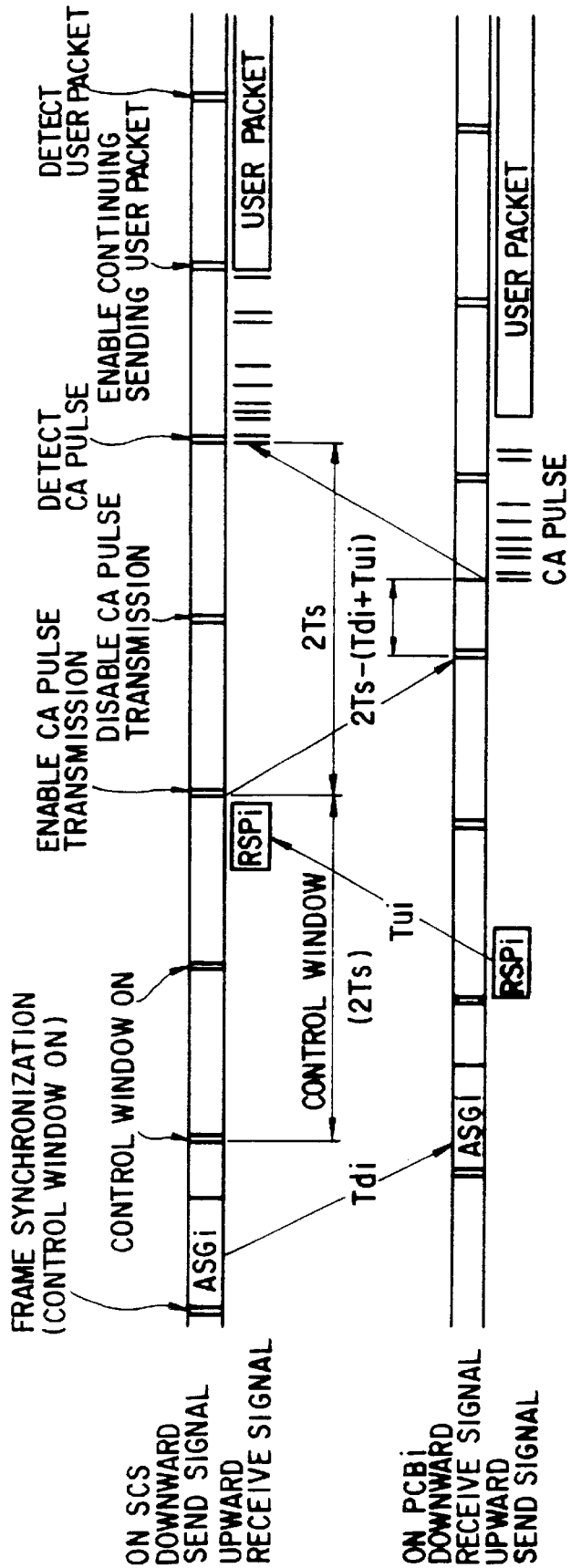
FIG. 7 is a flow sequence diagram for explaining a signal transmission operation when no signal collision occurs in the system shown in FIG. 3.
Figure 8:
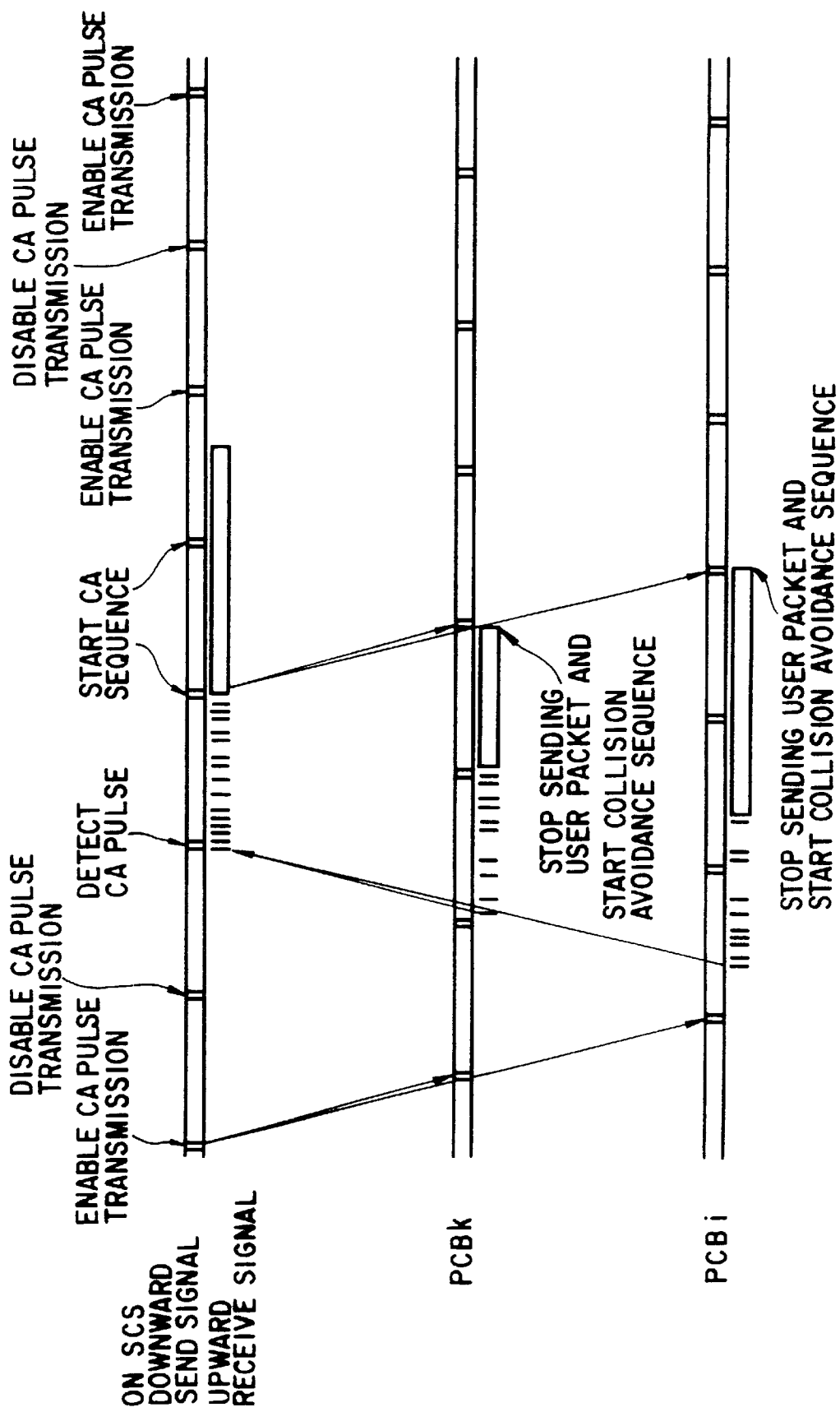
FIG. 8 is a flow sequence diagram for explaining a signal transmission operation including a collision avoiding operation when a signal collision has occurred in the system shown in FIG. 3.

A description will now be given of an operation of transmitting user information in the CATV network system according to this embodiment with the above-described structure. FIGS. 7 and 8 illustrate the flow sequences of that operation.

The letter "i" affixed to the aforementioned ASGi and RSPi is an identification number (hereinafter called "PCB-ID") specifically assigned to each information communication device (PCB), and ASGi means a signal destined for a PCB with the ID number i while RSPi means a signal transmitted from the PCB with the ID number i. ASGi signals include those which, like OA&M information, are to be reported to the entire PCB's or other PCB's than the PCBi.

In FIG. 7, the ASGi in the upward transmission signal transmitted from an SCS reaches the PCBi after a downward propagation time Tdi. After the reception of the ASGi, the PCBi sends out the RSPi after one subframe period (Ts). This RSPi reaches the SCS after an upward propagation delay time Tui. The SCS can acquire the downward and upward propagation delay times or the round trip delay time by measuring the arriving time of the RSPi, and can execute efficient access control (which will be discussed later) by informing the result. If the time width of the aforementioned control window is set to 2Ts, it is possible to cope with a network length of up to about 10 km. The network length, if longer than this value, can also be coped with by setting the length of the control window to 3Ts or shifting the control window to the time position which is determined in consideration of the propagation delay time between the SCS and fiber node (F/N).

The SCS measures the signal level of the received RSPi, acquires the difference between the measured value and a reference signal level, and instructs the PCBi to compensate for the level of the transmission signal by this difference. It is therefore possible to set the reception levels, at the SCS, of the signals transmitted from all the PCB's equal to one another. Each PCB is informed of the measuring result via the ASG signal.

When the SI signal becomes a state to "enable CA (collision avoidance) pulse transmission," the PCBi which has been storing transmitted user packets sends out a CA pulse at random time intervals after 2Ts−(Tdi+Tui) after the arrival of the SI signal, and starts sending the user packet following to the CA pulse. The output timing for this CA pulse is so set that only ten CA pulses are transmitted to a random slot position in a time slot width which allows, for example, a total of 20 pulses to be transmitted. The SCS starts measuring the number of the CA pulses arrived after 2Ts after the "enable CA pulse transmission" state. When just 10 CA pulses have been received within the time Ts, the SCS determines that there is no collision and renders the SI signal to "enable continuing sending user packet" as shown in FIG. 7. The PCBi which has received this SI signal continues the transmission of the user packet whose transmission has already been in progress until the packet transmission is completed.

SCS receives last of the user packet when CA pulse is normally detected, and transmits to the head-end via the ATM hub after performing necessary processings such as error correction processing. SCS determines a collision occurs when CA pulse is abnormally detected, and makes PCBS, which send the user packets, stop transmitting the packets by SI signal and gives instructions to execute a collision avoidance operation. The received packets are to be abandoned.

When the packet length is longer than the frame length, the SCS informs the PCBi to stop transmitting the control window in the next frame using the SI signal which becomes the frame sync signal. The PCBi may complete packet transmission without interrupting the packet transmission in the above manner.

When a collision occurs, on the other hand, a collision avoidance operation is executed in the following sequence. FIG. 8 shows the sequence flow of that operation. If different PCBi and PCBk have transmitted CA pulses at the same time, the SCS observes more than 10 pulses within Ts. When detecting pulses whose quantity is greater than a predetermined number, the SCS determines that a collision will occur and informs the PCBi and PCBk to "start collision avoidance operation" by means of the SI signal. The PCBi and PCBk which are informed of this event immediately stop transmitting a packet to initiate a predetermined collision avoidance sequence and wait for the SI signal becoming the "enable CA pulse transmission" state.

Although the downward transmission rate is set to, for example, 8.192 Mbps in the first embodiment, it is not limited to this particular rate. If the 64QAM modulation method is used in place of the QPSK modulation method, the tripled transmission rate can be set in the band of 6 MHz. That is, the adaptation of a much better modulation system can ensure information transmission in a faster and wider band even if the occupied band width is the same.

Figure 9A:
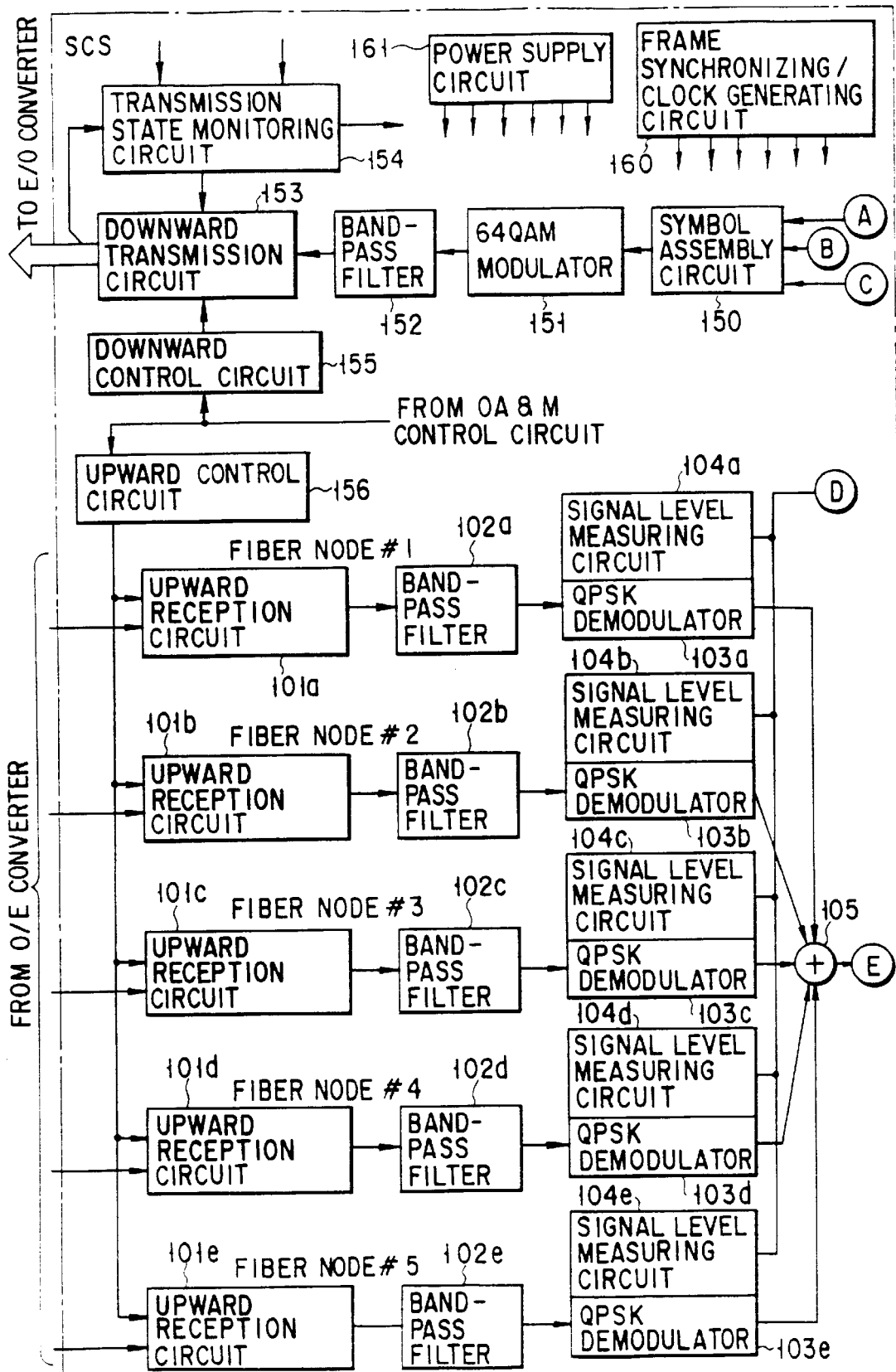
FIGS. 9A and 9B are circuit block diagrams showing the structure of a central information communication control device (SCS) provided at a distribution hub in the system shown in FIG. 3.

FIGS. 9A to 10 are block diagrams showing the functional structures of the central information communication control devices (SCS) 32a, 32b, and information communication devices (PCB) 70b1, 70b2, . . . , for accomplishing the above-described transmission operation.

The structures of the SCS's 32a, 32b, . . . , and PCB's 70b1, 70b2, . . . , shown in FIGS. 9A to 10 are premised on the case where three logical systems #1, #2 and #3 each capable of transmitting information at a rate of 8.192 Mbps are shared by five fiber nodes (FIN) by adapting the 64QAM modulation method for the downward transmission and one logical system capable of transmitting information at a rate of 2.048 Mbps is shared by five fiber nodes (F/N) for the upward transmission.

In FIG. 3, the upward transmission signal, which has been transmitted from, for example, the computer (PC) 80b1 via a connection cable 200, is input to the PCB 70b1. In this PCB 70b1, the upward transmission signal is input via a bus 200 and a 10BASE-T interface (I/F) 201 to a transmission MAC address detecting circuit 203 which detects the MAC address of the sender. The detected MAC address is transferred to a packet extracting circuit 244 which determines if the MAC address is registered in a management table provided in this packet extracting circuit 244. If the received MAC address is an unregistered, new MAC address, it is registered in the management table.

The upward transmission signal is then transferred to a packet output buffer 204 where it is affixed with the PCB-ID. An error correction code is then affixed to the resultant signal in an FEC (forward error correction) circuit 205. An OA&M control circuit 210 and an encryption key generator 209 produce OA&M management information and encryption key information based on the received ASG output from an ASG decoder 238. Those informations are input to an RSP output buffer circuit 211. This RSP output buffer circuit 211 assembles the RSPi signal based on the input information and the resultant signal is affixed with an error correction code in an FEC 212. Further, an access control circuit 206 activates a CA pulse generator 207 and an output timing control circuit 208 in accordance with the content of the SI signal (see FIG. 6) output from an SI decoder 240. As a result, the CA pulse generator 207 generates a CA pulse. The output timing control circuit 208 designates output timings to the packet output buffer 204, the CA pulse generator 207 and the RSP output buffer circuit 211 to instruct the transmission of a user packet, a CA pulse or an RSPi signal.

The transmission signal 261 transmitted in the above-described manner is input to a QPSK modulator 215 which performs QPSK modulation of a carrier signal 262 with the transmitted transmission signal 261. The modulated carrier signal 263 passes through a band-pass filter 216 and enters a transmission circuit 217. The transmission circuit 217 inserts the modulated carrier signal 264 in a predetermined transmission channel and controls the level of the carrier signal to be a predetermined transmission signal level under the control of a control circuit 220. The output signal of the transmission circuit 217 is then sent out to the upward transmission lines of a tree shaped transmission line 60b via a coupler 221.

A transmission state monitoring circuit 218 monitors to check if a signal stays transmitted due to a failure or the like or if the PCB 70b1 is malfunctioning. The transmission state monitoring circuit 218 has an ability to turn off the power of the transmission circuit 217 when the operation of the entire system may be interfered greatly as in the case where the signal stays transmitted. A power supply circuit 214 supplies power to the PCB 70b1.

The upward transmission signal transmitted to the tree shaped transmission line 60b from the PCB 70b1 is converted by the fiber node (F/N) 50b to an optical signal which is in turn supplied to the central information communication control device (SCS) 32a in the distribution hub (D/H) 30a. This optical signal is then converted to an electric signal by an unillustrated O/E converter and this electric signal is input to five reception circuits 101a–101e shown in FIG. 9A. The other reception circuits receive upward transmission signals which are transmitted via the associated fiber nodes F/N. The upward transmission signals are amplified and then frequency-converted in those reception circuits 101a–101e. The reception signals output from reception circuits 101a–101e pass through respective band-pass filters 102a to 102e and are demodulated in respective demodulators 103a to 103e. Those five demodulated transmission signals are ORed by an OR circuit 105.

The demodulators 103a–103e are respectively provided with circuits 104a to 104e each of which measures the reception level of the RSPi signal transmitted in response to the ASGi signal. The detection information of the reception signal levels acquired by those measuring circuits 104a–104e are transferred to a signal level control circuit 122 shown in FIG. 9B. On the basis of the detection information of the reception signal levels, this control circuit 122 performs an operation to control the transmission signal level for each of the PCB's 70b1, 70b2 and so forth.

The upward transmission signal output from the OR circuit 105 is distributed to an RSP decoder 106, a CA pulse decoder 109 and a packet decoder 110 in accordance with various timing signals output from a frame synchronizing/clock generating circuit 160 and are decoded by those decoders 106, 109 and 110. Of the distributed signals, the RSPi signal and user packet are subjected to error correction/coding in FEC circuits 107 and 111, respectively.

A propagation delay time measuring circuit (DL) 108 is connected to the RSP decoder 106 to measure the propagation delay time based on the reception timing of the RSP signal. The measured propagation delay time is transferred to a propagation delay time control circuit 123 which controls the propagation delay for each of the PCB's 70b1, 70b2, . . . , based on the measuring result. The information in the RSPi signal is also transferred to an OA&M circuit 121. This OA&A circuit 121 manages the operation states for the respective PCB's 70b1, 70b2 and so forth based on the transferred information, and transfers the management information to the network management device (NM) 14 provided in the head-end (H/E) 10 periodically or as needed. The OA&M circuit 121 also receives the signal from the NM14 and outputs a management information to the channel control section.

A PCB-ID elimination/MAC address detecting circuit 112 eliminates the PCB-ID of the upward user packet output from the packet decoder 110 and detects the MAC address in the packet. The upward user packet is sent via a connection cable 114 to the ATM hub 31a from a 10BASE-T interface (I/F) 113.

The PCB-ID and the MAC address, respectively eliminated and detected by the PCB-ID elimination/MAC address detecting circuit 112, are transferred to an encryption key control circuit 125. This encryption key control circuit 125 checks if the PCB-ID and the MAC address are registered in the management table, and newly registers them if they are unregistered.

The downward packet signal transferred via a connection cable 130 from the ATM hub 31a is input via a 10BASE-T interface 131 to an MAC address detecting circuit 132 where the MAC address is detected. The downward packet is then input to a DWPL scrambler 133 where the packet is affixed with an error correction code by an FEC 134, and is scrambled based on the encryption key corresponding to the MAC address managed by the encryption key control circuit 125.

The access control circuit 124 executes access control and management of the upward transmission lines that are shared by five fiber nodes, and the result is produced as an SI signal by an SI buffer circuit. An CRC circuit 136 affixes an error check code to this SI signal.

The OA&M control circuit 121 produces OA&M information for each PCB or all the PCB's based on the QA&M information sent from the NM 14 located at the head-end (H/E) 10. This QA&M information is input to an ASG buffer circuit 137 together with the information that is produced by the signal level control circuit 122 and the propagation delay time (DL) control circuit 123. On the basis of the received information, the ASG buffer circuit 137 assembles an ASGi signal which is affixed with an error correction code by an FEC circuit 138.

The downward transmission signal encoded by the DWPL scrambler 133, the SI signal produced by the SI buffer circuit 135 and the downward ASGi signal produced by the ASG buffer circuit 137 are input to a frame assembly circuit 139 to be assembled into a frame format shown in FIG. 5.

Of the above-described circuits, the 10BASE-T interface 131, MAC address detecting circuit 132, DWPL scrambler 133, SI buffer circuit 135, ASG buffer circuit 137 and frame assembly circuit 139 constitute a single unit which is provided for each logical system. As the apparatus in FIG. 9 is designed to cope with three logical systems #1, #2 and #3, there are three units.

The downward transmission signal formed by each unit is input to a symbol assembly circuit 150 shown in FIG. 9A.

The symbol assembly circuit 150 utilizes the fact that a single symbol consists of six bits as shown in FIG. 11, frame signals are assigned, two bits each, to predetermined positions in a symbol for the respective logical systems #1, #2 and #3, thereby ensuring logical multiplexing. The downward transmission signal undergone logical multiplexing is transferred to 64QAM modulator 151. This 64QAM modulator 151 executes 64QAM modulation of a carrier signal with the received downward transmission signal. The modulated carrier signal is input via a band-pass filter 152 to a transmission circuit 153, which performs frequency conversion and transmission amplification. The resultant signal is then sent to an E/O converter (not shown) provided in the distribution hub (D/H) 30a. In this E/O converter, this signal is converted together with other video signals or the like to an optical signal, which is in turn sent out to an optical fiber cable 40.

Figure 9B:
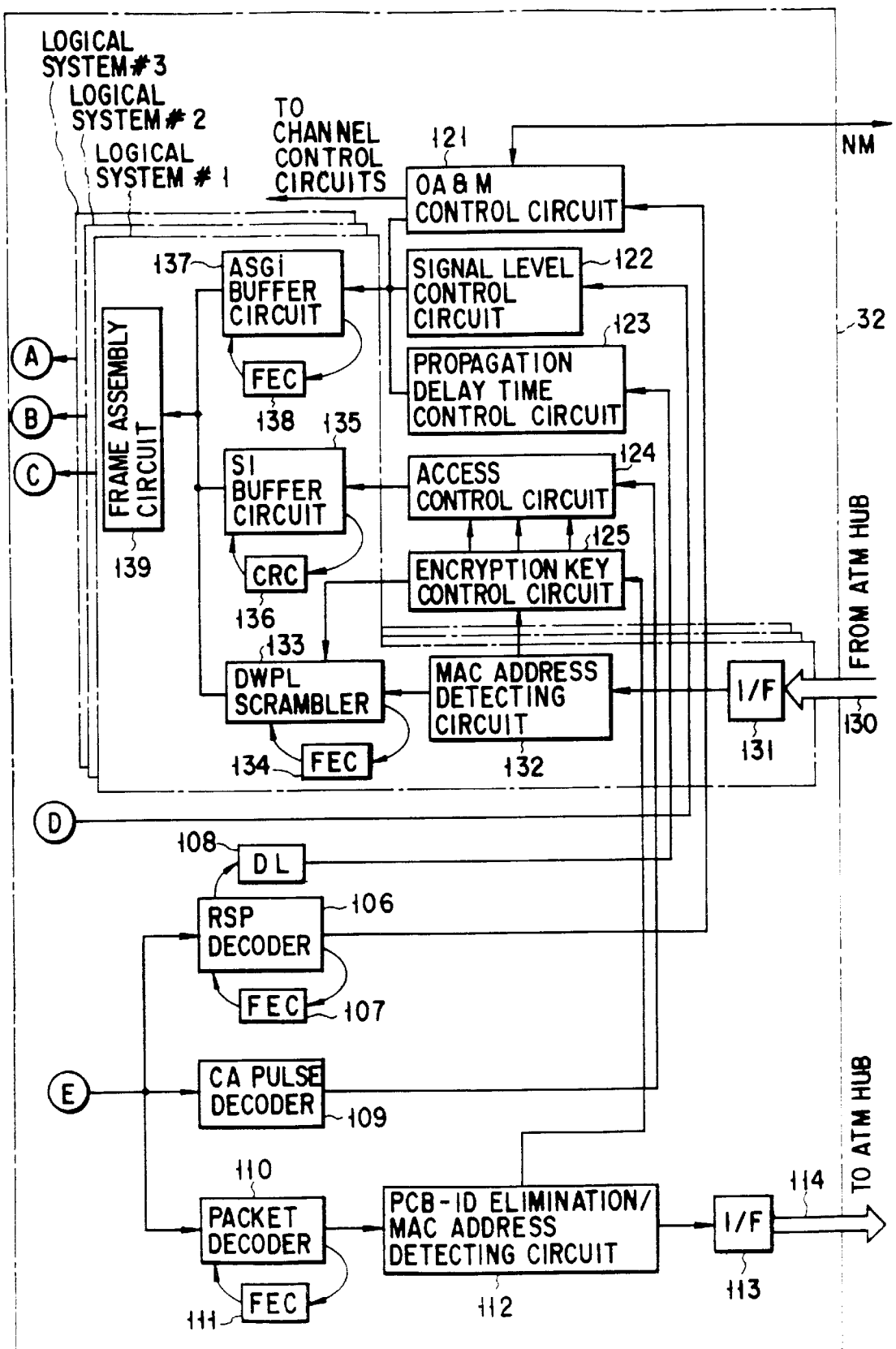

In FIGS. 9A and 9B, because a state monitoring circuit 154 and a power supply circuit 161 have the same functions as those in FIG. 10, their description will be omitted. A frame synchronizing/clock generating circuit 160 generates clocks for the synchronization of the operations of the individual sections. NM 14 sends a frequency channel number used by the downward and upward transmission lines to the channel control circuit 155, 156 (SCS) and 220, 231 (PCB) via the OA&M control circuit 121 (SCS) and 210 (PCB), respectively. The channel control circuits 155, 156 and 220, 231 control transmitting or receiving frequencies of the transmission circuit 153 (SCS) and 217 (PCB), and reception circuit 101 (SCS) and 230 (PCB) to correspond to the frequency channel number, respectively.

The downward transmission signal, which has sequentially passed the optical fiber cable 40b, fiber node (F/N) 50b and tree shaped transmission line 60b, reaches the PCM 70b1. In the PCB 70b1, as shown in FIG. 10, the downward transmission signal is input via a coupler 221 to a reception circuit 230 where reception amplification and frequency conversion of the received signal are performed. This received signal is transferred via a band-pass filter 232 to a 64QAM demodulator 233 to be demodulated. This demodulator 233 is provided with an equalizer circuit (EQL) 234 for suppressing echo signals from the open end of the tree shaped transmission line 60b. The echo signal component included in the received signal is suppressed by this equalizer circuit 234.

The demodulated signal output from the 64QAM demodulator 233 is input to a frame synchronizing/clock generating circuit 235 and a paired bit extracting circuit 236. On the basis of the demodulated signal, the frame synchronizing/clock generating circuit 235 generates various sync signals and timing signals, which are in turn supplied to the individual circuits in the PCB 70b1. The paired bit extracting circuit 236 extracts a 2-bit pair, informed, PCB by PCB, by the ASGi signal and corresponding to the logical system numbers to which the local PCB 70b1 belongs, from a sequence of six bits. The extracted paired bits are transferred to an ASG decoder 238 and an SI decoder 240. When the demodulated signal is a data packet, it is transferred directly to a DWPL descrambler 242. The logical node control circuit 237 specifies 2-bit pair corresponding to self-PCB from 6-bit series of 1-symbol and controls the pair bit extracting circuit 236.

The ASG decoder 238, SI decoder 240 and DWPL descrambler 242 are respectively provided with FEC or CRC circuits 239, 241 and 243. The aforementioned paired bits are subjected to error correction in the FEC circuit 239 or 243 before or after undergoing descrambling. The ASGi signal detected by the ASG decoder 238 is transferred to an output timing control circuit 208, an encryption key generator 209, an OA&M control circuit 210 and signal level/channel control circuits 220 and 231, and the SI signal and its CRC result signal detected by the SI decoder 240 and CRC 241 are transferred to an access control circuit 206 for controlling upward access.

The output signal of the DWPL descrambler 242 is transferred to a packet extracting circuit 244, which checks the destination MAC address described in each packet and extracts, as needed, just the packet that is destined to the MAC address belonging to the local PCB. This packet destined to the local PCB is sent out to the computer (PC) 80b1 via the connection cable 200 from the 10BASE-T interface 201.

To avoid collision of the downward packet signal and the upward packet signal in the 10BASE-T interface 201, a buffer memory should be provided in the packet extracting circuit 244 so that the transmission of the downward packet to the 10BASE-T interface 201 is held in the buffer memory until the transmission of the upward packet signal from the computer is completed.

The ASGi signal is sequentially and repeatedly transmitted to all the registered PCB's 70b1, 70b2 and so forth from the SCS's 32a, 32b and so forth, irrespective of whether or not the PCB's 70b1, 70b and so forth are powered on. Accordingly, the propagation delay time control and signal level control of the powered PCB are completed in a short period of time to enable the transmission. As the ASGi signal is repeated transmitted from the SCS thereafter, the PCB can surely follow up chronological changes of the transmission amplifier, etc., of the transmission circuit.

Because an encryption key can be changed frequently, it is possible to make the decoding or unauthorized usage by a third party significantly difficult.

In the above description, it is assumed that all the upward packets sent from the computers 80b1, 80b2 and so forth are transferred to the head-end 10 via the SCS's 32a, 32b, . . . , and the ATM hubs 31a and so forth. In the communication between the computers (PC) 80b1, 80b2, . . . , the packet may be returned in the downward direction based on the MAC addresses that are detected by the SCS's 32a, 32b and so forth, or the ATM hub 31a, etc.

According to the system of this embodiment as described above, the SCS's 32a, 32b and so forth respectively provided in the distribution hubs (D/H) 30a, 30b and so forth measure the propagation delay time between the PCB's 70b1, 70b2 and so forth and the level of the received signal, and execute collision detection using the CA pulse and the transmission of a user packet based on these measurements.

It is therefore possible to set all the levels of the upward transmission signals reaching the SCS's 32a, 32b and so forth from the PCB's 70b1, 70b2 and so forth equal to one another, and to set the S/N ratios of all the signals with respect to the ingress noise to the constant and optimal conditions. This can reduce packet loss caused by the deterioration of the SIN ratio of the upward transmission signal and to hold high throughput accordingly. As the level difference of the signals reaching the SCS's 32a, 32b and so forth from the PCB's 70b1, 70b2 and so forth can be eliminated regardless of the connected positions of the PC's 80b1, 80b2 and so forth in the network, the fairness among the PC's 80b1, 80b2 and so forth can be maintained.

By sending and detecting the CA pulse based on the results of measuring the propagation delay time and the reception signal level, the arrival time of the CA pulse can be made constant among the PCB's 70b1, 70b2 and so forth, and the threshold value of the pulse detector can be increased. It is therefore possible to shorten the pulse width of the CA pulse and increase the number of CA pulses that can be retained within a predetermined time, so that collision can be avoided with a higher probability.

Further, the tradeoff problem of a higher throughput characteristic and a longer network length can be overcome by controlling the output timing or the like of CA pulses based on the result of measuring the propagation delay time.

FIG. 12 shows the throughput characteristic of the CATV or HFC with the network length of 10 km in comparison with the throughput characteristic of the Ethernet with the network length of 2.5 km and the throughput characteristic of the CSMA system. The characteristics in FIG. 12 were acquired through simulation by setting the structural ratio of the longest packet to the shortest packet to 8:2. As is apparent from FIG. 12, while the network length in this invention is four times that of the Ethernet, this invention has as a good throughput as the Ethernet.

Although a CA pulse is transmitted to avoid collision in the above-described embodiment, random data or specific data affixed with an error check code (CRC) instead of the CA pulse may be transmitted so that the occurrence of collision can be determined by checking if there is an error in the random data or specific data received by the SCS.

Further, it is possible to properly cope with a system having a longer network length by setting the control window length of upward transmission signals or the position of the control window based on the result of measuring the propagation delay time.

According to this invention, the encryption encoding of downward packet signals becomes possible by providing both of the SCS's 32a, 32b, . . . , and the PCB's 70b1, 70b2, . . . , with the MAC address detecting function, thus eliminating the need for a countermeasure to information leakage on the application level by users.

As the upward access control information is transmitted downward as the SI signal, the overhead can be minimized so that the payload container (DWPL) for transmitting downward packets can be increased.

When 64QAM is used for downward transmission, if the structure is a one-system structure with an information transfer rate of 24 Mbps, overflow may occur at the 10BASE-T interface. To cope with this problem, a flow control function with a large-capacity buffer memory should be provided in each PCB, with an inevitable significant cost increase. As the overall system has three logical systems with a transfer rate of 8 Mbps in this embodiment, however, such a significant cost increase can be avoided.

While the MAC address detecting function and the like are provided in the above-described embodiment to encode downward packet signals based on encryption keys produced by each PCB, it is also possible to execute the encoding on the application level on the computer side or the server side. Those double security systems can ensure firmer and safer security. If the encoding on the application level is sufficient, it is unnecessary to detect an MAC address packet by packet in each SCS or PCB, which will result in a lower manufacturing cost accordingly.

Although this embodiment has been described as using an MAC address, an IP address may be used instead. In this case, the description position of an IP address in a packet is not fixed, so that software-based processing becomes necessary.

Figure 13:
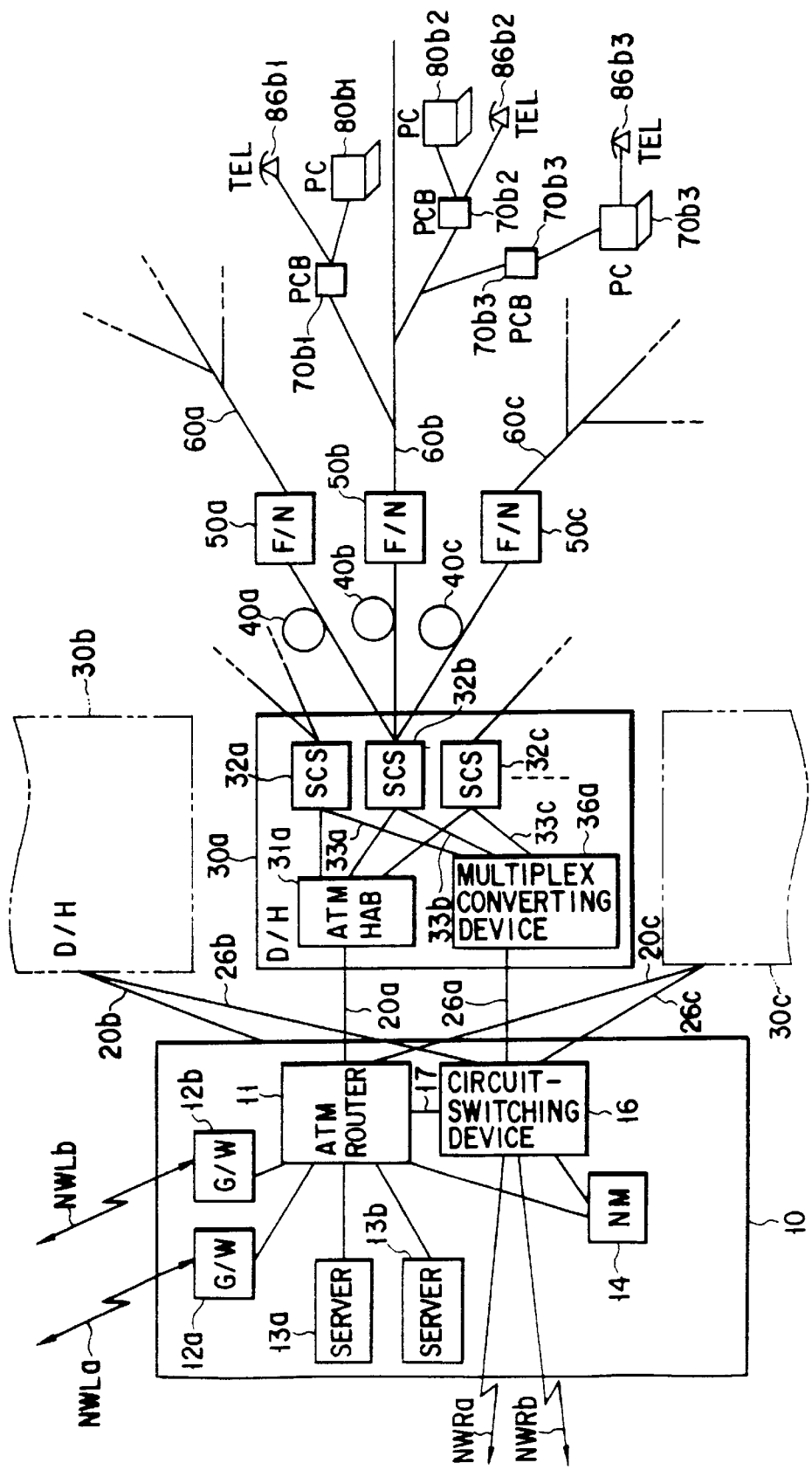
FIG. 13 is a schematic structural diagram of a CATV network system according to the second embodiment of this invention.

FIG. 13 is a schematic structural diagram showing the second embodiment of this invention, which simultaneously provides a connection oriented type telephone or data service and the above-discussed connection-less information communication service. To avoid the redundant description, like or same reference numerals are given to those components in FIG. 13 which have the same functions or performances and are the same as the corresponding components in FIG. 3. The following description will essentially discuss the connection oriented telephone or data service.

In FIG. 13, the head-end 10 is provided with a circuit-switching device 16 which is connected via a relay line NWR, in addition to the aforementioned ATM router 11. This circuit-switching device 16 is connected via lines 26a, 26b, 26c, . . . , to multiplex converting devices 36a, 36b, 36c, . . . , which are provided in the distribution hubs (D/H) 30a, 30b, 30c and so forth.

The multiplex converting device 36a executes multiplex conversion in such a way that downward communication time slots with a frame period of 125 μsec and a common control time slot for the call/incoming call control, which are multiplex-connected to the line 26a between the multiplex converting device 36a and the circuit-switching device 16 as shown in, for example, FIG. 14, match with the format with a frame period of 5 msec shown in FIG. 5, and outputs the resultant time slots to lines 33a, 33b, 33c between the multiplex converting device 36a and the central information communication control devices (SCS) 32a, 32b, 32c and so forth. The multiplex converting device 36a also executes reverse multiplex conversion on upward communication time slots and a common control time slot and outputs the resultant time slots to the line 26a. Each of the SCS's 32a, 32b, 32c and so forth is provided with a circuit for handling the communication time slots and common control time slot, a telephone number/PCB-ID management table for managing the correlation between the subscribers' telephone numbers and the PCB-ID's assigned to the telephone numbers, and a circuit for encoding the downward communication time slots based on the aforementioned encryption key, in addition to the above-described circuit which handles the ASGi and RSPi signals and packet information. Each of the information communication devices (PCB) 70b1, 70b2, 70b3 and so forth is likewise provided with a circuit for handing the communication time slots and common control time slot, a circuit for decoding encoded downward communication slots and a telephone interface circuit which connects telephones 86b1, 86b2, 86b3 and so forth.

Figure 15:
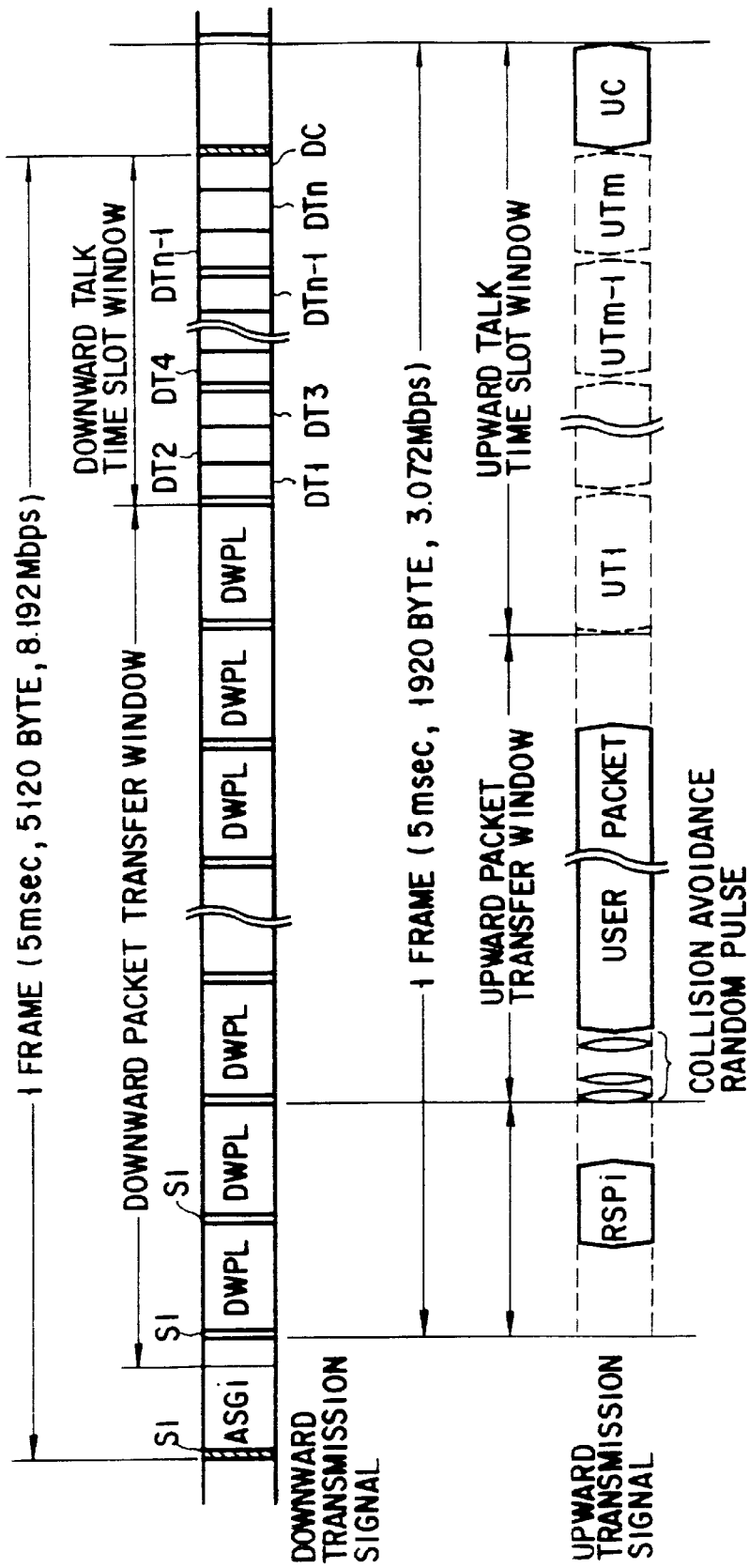
FIG. 15 is a diagram showing the transmission formats of a downward transmission signal and an upward transmission signal in the system shown in FIG. 13.

FIG. 15 exemplifies the transmission format of downward and upward transmission signals for the simultaneous presentation of the connection-less packet communication service and connection oriented type telephone or data service with the above-described structure. A downward transmission signal has a frame length of 5 msec per logical system and a physical transfer rate of 8.192 Mbps as per the first embodiment. The same is true of the ASGi signal and the payload container DWPL within the downward packet transfer window, which are used to control the propagation delay time, with the difference that a downward communication time slot transfer window is provided in the second half portion of the frame and communication time slots DT1 to DTn and a common control time slot DC for the call/incoming call control are set in this window.

Each of upward transmission signals also has a frame of 5 msec but its physical transfer rate is 3.076 Mbps faster than that of the downward transmission signals. Like the downward transmission signal, the upward transmission signal has communication time slots UT1 to UTm and a common control time slot UC set in the second half portion. Those time slots are all subjected to propagation delay time control and signal level control so that bit-synchronized signals with predetermined signal levels and predetermined lengths are inserted at predetermined positions, as done in the case of the above-discussed connection-less packet communication service.

With the above-described structure, telephone call and ringing are executed as follows. If a "call" is made to the telephone 86b1 from an external circuit-switching network, the ringing first makes a "reception request" to the circuit-switching device 16 via the line NWR. This circuit-switching device 16 checks the receiver telephone number to find the distribution hub (30a) and SCS (32b) to which this receiver telephone number is assigned, and sends the "reception request" to the SCS 32b and designates a communication time slot, via the multiplex converting device 36a and the common control time slot on the line 26a. The SCS 32b refers to the telephone number/PCB-ID management table to find the PCB-ID (70b1) to which the ringing destination telephone number is assigned, enables the "activation on reception" of the PCB-ID 70b1 via the common control time slot DC shown in FIG. 15 and designates the upward and downward communication time slots (DTb1 and UTb1, for example). In the PCB 70b1, the telephone interface circuit is activated to ring the telephone 86b1. When the telephone 86b1 is set to the off-hook state, the PCB 70b1 sends "response" to the circuit-switching device 16 via the upward communication time slot UTb1 in the reverse path. Accordingly, the communication state is established via the downward and upward time slots.

When the telephone 86b1 calls a telephone which is connected to an external circuit-switching network, the off-hook state of the telephone 86b1 is detected by the telephone interface circuit of the PCB 70b1 and the reception of a dial pulse is initiated immediately. When the reception of the dial pulse is completed, a "call request" is made to the circuit-switching device 16 via the upward common control time slot UC and the multiplex converting device 36b of the SCS 32b. The circuit-switching device 16 checks the receiver destination number, sends a "reception request" to the desired receiver via the NWR, and designates a communication time slot to the PCB 70b1 via the common control time slot. The "response" from the receiver sets the communication state.

In the foregoing description, at the time of making a call from the telephone 86, a "call request" is transmitted via the common control time slot UC. Since this time slot is shared by a plurality of PCB's, collision can occur though the probability is very small. The access control system which copes with such collision is to provide an error check code in, for example, the upward common control time slot UC, check the presence or absence of an error in the slot UC by the SCS, determines that no collision has occurred if there is no error, and transfer the received contents in the previous UC to the associated PCB for confirmation via the downward common control time slot DC. When an error is detected, on the other hand, it is determined that collision has occurred, so that the associated PCB is caused via the slot DC to initiate a predetermined collision avoidance operation after which the resending of the transmission signal may be instructed.

According to this invention, since the above-described signal level control is executed even in such a collision operation, the levels of colliding two or more signals become approximately equal to one another, so that the destruction of only a specific signal may be or may not be avoidable. It is therefore possible to keep the fairness.

Although the access control method in the connection-less system of the first embodiment has used a collision avoidance random pulse, access control may be executed by sending data affixed with an error check code and checking an error in this data as done in the second embodiment.

The circuit-switching device 16 designates communication time slots to be used on the multiplex lines 26 and 33 as well as the optical fiber cables 40 and 60. If the lines 26 between the circuit-switching device 16 and the multiplex converting device 36 are not concentrated, the front end switch which performs the concentrating function may be provided in place of the multiplex converting device 36 and a time slot may be assigned for each call or reception request.

The circuit-switching network generally performs switching by the units of 64 kbps. Because a greater number of communication time slots are connected with the frame structure shown in FIG. 15, time slots two to eight times as great as is allowed previously can be connected by adapting or additionally using the band compression technique, such as ADPCM (32 kbps) or VSELP (16 kbps, 8 kbps). This approach can increase the number of subscribers to receive the service, accordingly.

When the communication time slots have transfer rates of 64 kbps, communication resources of 1.536 Mbps are used both for upward and downward transmissions in order to connect 24 time slots. If the ADPCM coding system is used and the transfer rate per time slot is 32 kbps, approximately 48 time slots, two times the former case, can be connected. If the VSELP coding system is used, about 96 to 192 time slots can be connected. Those band compression circuits may be provided in the multiplex converting devices 36 and PCB's.

In addition, in a connection oriented type data service described later, a connection oriented type data communication surroundings having wide band can be provided by assigning a plurality of time slots to a single user.

It is also possible to present a more efficient information communication network service by dynamically assigning connection-less transmission bands and connection oriented type transmission bands in accordance with the individual real traffics. Because the transmission bands are separated to the packet transfer window for connection-less communication and the communication time slot window for connection oriented type communication in addition to the control window and are controlled and managed in this form in this invention, the aforementioned information communication network service can be accomplished easily by properly shifting the boundaries between the windows in accordance with the real traffics.

Although a dial pulse type telephone called a standard telephone has been discussed as an example of a telephone, it is needless to say that a pushbutton type as well as the ISDN terminals can receive the same services by properly using the common control time slot. Furthermore, a connection oriented type data service can be provided by combining the above connectionless type system in addition to the telephone service. That is, in FIG. 13, connection oriented type data service and that of connectionless type can be simultaneously realized, for example, by connecting the exchanger 16 to ATM router 11 via the interface 17, and combining the circuit for connection oriented type and the circuit for connectionless type via the packet extracting circuit 244. The merit of this structure is as follows.

In the connectionless type service, since the transmission line is shared by a large number of users, in a case a wealth of data is transmitted on the transmit line in a long time by a few users or by an abnormal operation, other user cannot carry out a desired data communication. In above situation, the connection oriented type service can always assure the data service having constant speed without an influence of the traffic from other users. A simultaneous use of the connectionless type and connection oriented type service makes possible to select a suitable service (connectionless type or connection oriented type) according to the user's request, and is very effective to improve the flexibility of the service.

This invention is not limited to above-described two embodiments. Assume a hypothesis traffic ratio of the downward and upward transmission lines are respectively Td:Tu and an effective throughput (The effective throughput is defined by a throughput for maximum average traffic. In FIG. 12, upward throughput reaches about 60% when an offered traffic increases. In an actual working, since collisions increase and the delay time extremely increases, the maximum average offered traffic is set about 50% and a system is designed not to exceed the maximum average offered traffic.) are respectively Pu and Pd, an information transmission faculty ratio is ideally set to Td/Pd:Tu/Pu, respectively.

More specifically, in a case the hypothesis traffic ratio is 30:1, a downward effective throughput without contention is about 70% and an upward effective throughput performing contention control based on CSMA/CD is about 30% (see FIG. 12), the ideal information transmission faculty upward ratio becomes about 13:1. This indicates one logical system having the information transmission faculty of 2 Mbps may be assigned for three downward logical system having the information transmission faculty of 8 Mbbps adapting 64 QAM method explained in FIGS. 7 and 8. That is, in this example, 64 QAM transmission is carried out by using one channel having 6 MHz frequency band width, QPSK transmission is carried out by using one channel having 1.5 MHz frequency band width in an upward direction, and signals are logical multiplexed in the central information communication control device (SCS) as described above.

On the other hand, in Web server access, etc., via the Internet, upward traffic is supposed about ⅟10 for downward traffic, because of transmission confirmation based on TCP protocol and access information transmission to the Web server. In this case, the ideal information transmission faculty ratio becomes about 4:1, and one upward logical system (2 Mbps) may be assigned for the one downward logical system (8 Mbps). In this example, when the traffic which all user in the fiber node can be retained by one logical system is supposed, one channel of 1.5 MHz for QPSK transmission can be assigned by adapting the frequency re-usage set forth in the upward direction to one downward channel of 6 MHz of 64 QAM transmission. It is apparent the upward logical systems are not logical multiplexed in the SCS, and correspond to predetermined downward logical systems, respectively.

The QAM modulation method can allow the same hardware (modulator/demodulator) to be used as a 256QAM modulator/demodulator, a 64QAM modulator/demodulator, a 16QAM modulator/demodulator and a QPSX modulator/demodulator depending on the setting of the parameters (called as a fall back). It should however be noted that the higher the multiplexity (the number of bits forming one symbol) is, the poorer the noise vs. bit error characteristic becomes.

For transmission lines whose downward transmission quality is excellent, four logical systems can be multiplexed with 256QAM modulation (8 bits/symbol), and one of 64QAM (the number of multiplexed logical systems: 3), 16QAM (the number of multiplexed logical systems: 2) and QPSK (the number of multiplexed logical systems: 1) can be selectively enabled as needed in accordance with the degree of the deterioration of the transmission quality.

According to this invention, it is possible to select 256QAM modulation for a site which has not aged much after the establishment and has an excellent noise environment, and to select the modulation method whose multiplexity matches with the noise environment, so that the system can be managed flexibly in accordance with the states of the individual fiber nodes or the individual sites. When the above-described method is adaptively employed or when some kind of noise temporarily enters the downward transmission lines, for example, it is possible to switch the modulation method to the one with a lower multiplexity and return it to the modulation method with the original modulating performance after the noise is eliminated during the ingress noise, thus reducing the possibility of service interruption or quality deterioration.

Figure 16:
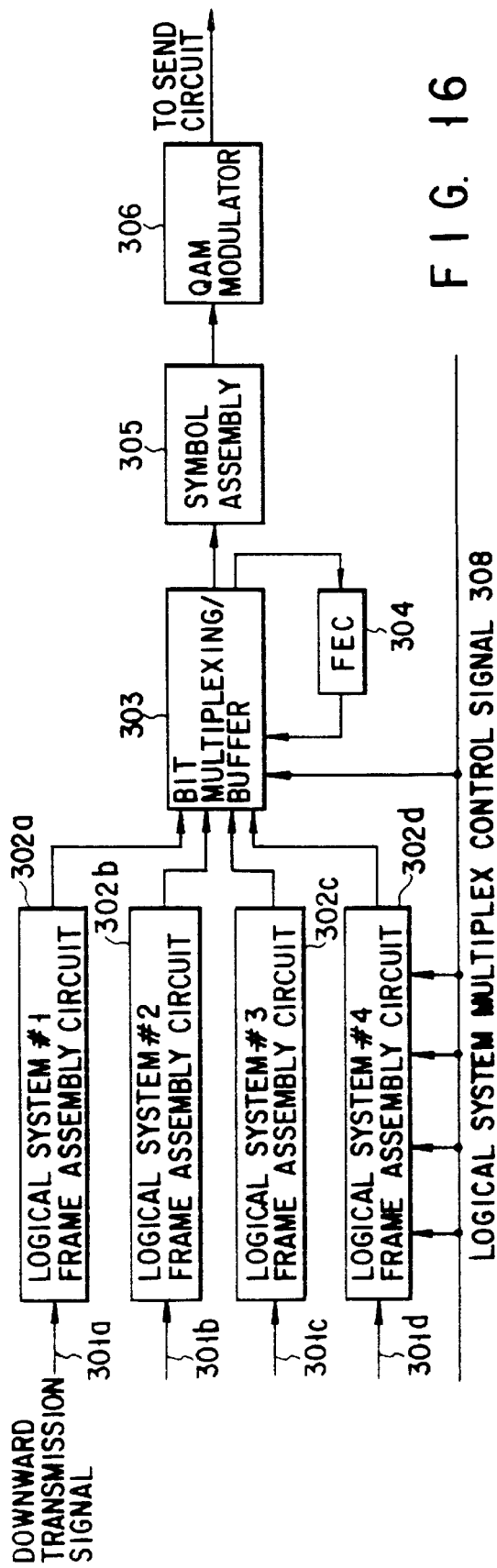
FIG. 16 is a diagram exemplifying the structure of a downward multiplex modulating system in an SCS in a CATV network system according to a modification of the first embodiment of this invention.
Figure 17:
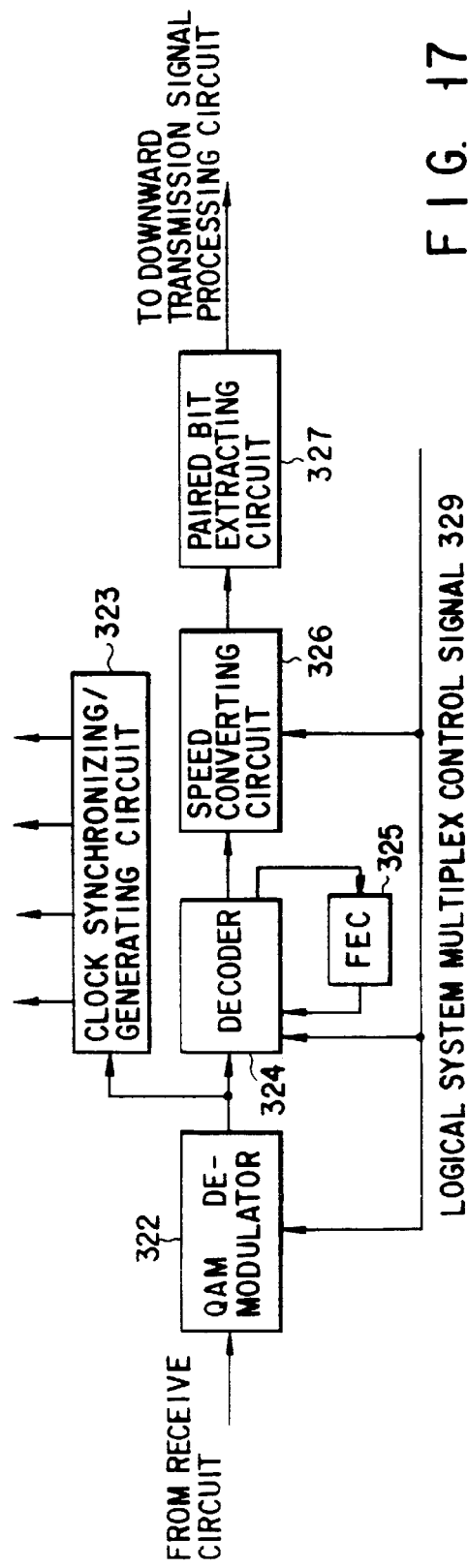
FIG. 17 is a diagram exemplifying the structure of a downward modulating/extracting system in a PCB in the CATV network system according to this modification of the first embodiment of this invention.

Although after an error correction code is affixed to a logical system unit consisting of paired two bits, the paired two bits are multiplexed to form a single symbol in those embodiments, the structures shown in FIGS. 16 and 17 may be employed. As shown in FIG. 16, downward transmission signals 301a to 301d each consisting of paired two bits input via logical systems #1 to #4 frame assembly circuits 302a to 302d may be multiplexed by a bit multiplexing/buffer 303, and the multiplexed 2-bit pairs may be subjected to error correction/coding, after which a symbol is extracted for each predetermined number of bits by a symbol assembly 305. This symbol is modulated by a QAM modulator having the same function as the aforementioned QAM modulator, and is output via an unillustrated band-pass filter to the transmission circuit. Of course, the above-discussed advantages can be acquired by multiplexing paired two bits affixed with an error correction code, further subjecting the multiplexed 2-bit pairs to error correction/coding, and then extracting a symbol for each predetermined number of bits.

In this case, the circuitry on the modulation side is designed as shown in FIG. 17, and the signal received at the reception circuit is input via an unillustrated band-pass filter to a QAM demodulator 322. The signal demodulated by the QAM demodulator 322 is decoded by a decoder 324, and an error correcting/decoding process is performed on the entire multiplexed 2-bit pairs by an FEC 325. Thereafter, the resultant signal is sent through a speed converting circuit 326 to a paired bit extracting circuit 327 where paired two bits constituting a logical system are extracted and transmitted to the downward transmission signal processing circuit. A frame synchronizing/generating circuit 323 in FIG. 17 has the same function as the frame synchronizing/generating circuit 235 in FIG. 10. The logical system multiplexing control signals 308 and 329 specify 2-bit pair corresponding to self-PCB from 6-bit series of 1-symbol and control the pair bit extracting circuit 236.

The reason why one logical system consists of paired two bits in the above embodiment is just because the QPSK modulation method is employed as the standard modulation method. An arbitrary number of bits equal to or greater than 1 may be treated as a reference pair (bit group). Further, bit groups with different numbers of bits may be multiplexed to one another. Furthermore, although QAM has been described as one example of the modulation method in the foregoing description, this invention may of course be adapted to a multivalue modulation method like FSK (Frequency Shift Keying).

The entire multiplexing system discussed above is called "symbol division multiplexing (YDM)" in this invention as compared with such as time division multiplexing (TDM), frequency division multiplexing (FDM), code division multiplexing (CDM) or wavelength division multiplexing (WDM), etc. Further, the multiplexing in which multiplexed bit groups directly form a symbol is called "explicit YDM (E-YDM)" and the multiplexing in which a process like error correction/coding is performed on the entire multiplexed bit groups is called "implicit YDM (I-YDM)."

The YDM method assigns a plurality of logical systems to predetermined bit groups, respectively, forms a symbol from a set of those bit groups and modulates the symbol. The E-YDM allows a set of bit groups to form a symbol, whereas the I-YDM extracts a symbol after error correction/coding is performed on a set of bit groups. This multiplexing, whether it is the E-YDM or I-YDM, can improve the independency between logical systems to be multiplexed and can selectively use the proper number of logical systems to be multiplexed, thus relaxing the adapting conditions of the system in view of the transmission line quality.

In E-YDM method, an error correction code is affixed for a bit group, and has possibility of concentrating errors to a specific group by modulation method and assembly method of the bit group. As measure for equalizing error rate among the groups, an assembly of bit groups may be changed according to a predetermined rule.

Although the foregoing description of those embodiments has discussed the case of using a CATV or HFC network system which fundamentally employs frequency multiplexing, this invention can also be adapted to a star shaped optical network system. The star shaped optical network system has the same characteristics as the tree shaped network system, and have more relaxed conditions on the transmission quality than the coaxial-cable based network, such as less signal level attenuation and the occurrence of no ingress noise because of the use of optical fibers as transmission lines. Therefore, if this invention is adapted to the star shaped optical network system, this system has the same advantages as the tree shaped network system.

Further, a wavelength multiplexing transmission method may be used as a signal transmission method in stead of the above-described frequency multiplexing transmission method. This modification eliminates the need for a modulated signal so that and can accomplish information transmission using base-band signals.

The structures of the SCS and PCB and the transmission formats of transmission signals, for example, may be modified in various other forms within the scope and spirit of this invention.

Each of transmission lines of above tree shaped network and star shaped network is not limited to optical fiber, coaxial transmit line, etc., and can be realized by wireless transmission.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information communication network system, comprising:

a plurality of information communication devices to which at least one information device is connected;

tree shaped or star shaped bidirectional transmission lines for connecting said information communication devices; and at least one central information communication control device located upward of said bidirectional transmission lines, wherein said central information communication control device, includes, access control information generating means for detecting an information communication access state on upward transmission lines in said bidirectional transmission lines and for generating information communication access control information in order to control accesses of said upward transmission lines by said information communication devices, and downward transmission means for transmitting said information communication access control information, produced by said access control information generating means, to downward transmission lines in said bidirectional transmission lines toward said plurality of information communication devices, and wherein each of said plurality of information communication devices, includes, access control information receiving means for receiving said information communication access control information transmitted from said central information communication control device, and information communication control means for controlling information communication processing of a respective one of said plurality of information communication devices based on said information communication access control information received by said access control information receiving means.

2. The information communication network system according to claim 1, wherein said upward transmission lines bidirectional transmission lines are separated from said downward transmission lines of said bidirectional transmission lines, and said bidirectional transmission lines are separated from the other bidirectional transmission lines or one-directional transmission lines, by frequency division multiplexing or wavelength division multiplexing.

3. The information communication network system according to claim 1, wherein said bidirectional transmission lines are asymmetrical transmission lines whose downward transmission lines can transfer information faster than upward transmission lines.

4. The information communication network system according to claim 3, wherein, in said asymmetrical transmission line, transmission speed ratio of the downward and upward transmission lines is set based on a hypothesis traffic ratio of downward and upward transmission lines and respective hypothesis effective throughput of downward and upward transmission lines.

5. The information communication network system according to claim 1, wherein said access control information generating means generates information communication access control information including at least one of information indicating if information transmission is performed on an upward transmission line and information indicating if information transmission from at least one information communication device suffers a contention on an upward transmission line.

6. The information communication network system according to claim 5, wherein said access control information generating means measures at least one of a propagation delay time with respect to an information communication device and a reception level of an upward transmission signal from an information communication device, and generates said information communication access control information based on one of the delay time and the reception level.

7. In an information communication network system comprising a plurality of information communication devices to which at least one information device is connected, tree shaped or star shaped bidirectional transmission lines for connecting said information communication devices, and at least one central information communication control device located upstream of said bidirectional transmission lines, said central information communication control device comprising:

access control information generating means for detecting an information communication access state on upward transmission lines in said bidirectional transmission lines and generating information communication access control information in order to control accesses of said upward transmission lines by said information communication devices; and downward transmission means for transmitting said information communication access control information, produced by said access control information generating means, to downward transmission lines in said bidirectional transmission lines toward said at least one information communication device.

8. The central information communication control device according to claim 7, wherein said downward transmission means, includes, modulation means for modulating symbols each consisting of a bit sequence of a predetermined length, and said modulation means, includes, means for assigning a plurality of framed logical systems to a respective predetermined bit group, means for generating a symbol from a set of said respective predetermined bit group, and means for modulating said generated symbols.

9. The central information communication control device according to claim 8, wherein said predetermined bit sequence is a set of said respective predetermined bit group.

10. The central information communication control device according to claim 8, wherein said modulation means includes means for extracting said symbol from a bit sequence obtained by performing an error correcting process on said set of said predetermined bit groups.

11. The central information communication control device according to claim 8, wherein said information network system further comprises managing means for managing the network, and said modulation means includes means for selecting a length of a bit sequence constituting said symbol in accordance with a transmission line quality and an operation of said managing means.

12. The central information communication control device according to claim 8, wherein said information network system further comprises managing means for managing the network, and said modulation means includes means for adaptively selecting a length of a bit sequence constituting said symbol in accordance with a transmission line quality and an operation of said managing means.

13. In an information communication network system comprising a plurality of information communication devices to which at least one information device is connected, tree shaped or star shaped bidirectional transmission lines for connecting said information communication devices, and at least one central information communication control device located upward of said bidirectional transmission lines and having means for detecting an information communication access state on upward transmission lines in said bidirectional transmission lines to generate information communication access control information for controlling an access of said upward transmission lines by said information communication devices, and transmitting said information communication access control information to downward transmission lines in said bidirectional transmission lines, each of said information communication devices comprising:

access control information receiving means for receiving said information communication access control information transmitted from said central information communication control device; and information communication control means for controlling information communication processing based on said information communication access control information received by said access control information receiving means.

14. In an information communication network system including a plurality of information communication devices to which at least one information device is connected, tree shaped or star shaped bidirectional transmission lines for connecting said information communication devices, and at least one central information communication control device located upward of said bidirectional transmission lines, an information transmission method for executing information transmission between said central information communication control device and at least one of said information communication devices, comprising the steps of:

detecting an information communication access state on upward transmission lines in said bidirectional transmission lines;

generating information communication access control information based on a result of the detecting and transmitting said information communication access control information to an associated information communication device in order to control accesses of said upward transmission lines by said associated information communication device; and receiving said information communication access control information at said associated information communication device, and controlling information communication processing of said associated information communication device based on said received information communication access control information.

15. An information communication network system comprising:

tree shaped or star shaped bidirectional transmission lines including upward transmission lines having a predetermined transmission rate and downward transmission lines having a higher transmission rate than that of said upward transmission lines;

a plurality of information communication devices which are connected to said bidirectional transmission lines and to each of which a connection-less information device is connected; and a central information communication control device which is located upward of said bidirectional transmission lines and to which at least one connection-less information processing device is connected directly or via another transmission line or another communication device, wherein information transmitted from said connection-less information device is essentially transmitted in said upward transmission lines, and information transmitted from said connection-less information processing device is essentially transmitted in said downward transmission lines.

16. An information communication network system comprising:

tree shaped or star shaped bidirectional transmission lines including upward transmission lines having a predetermined transmission rate and downward transmission lines having a higher transmission rate than that of said upward transmission lines;

a plurality of information communication devices which are connected to said bidirectional transmission lines and to each of which at least one of an information device for performing connection-less communication, an information device for performing connection oriented type communication and a communication device is connected; and a central information communication control device, located upward of said bidirectional transmission lines, to which at least one connection-less information processing device and a connection oriented type information processing device are connected directly or via other transmission lines or other communication devices, wherein connection-less information and connection oriented type information are transmitted in symbol division multiplexed form on said upward transmission lines and said downward transmission lines.

17. An information communication network system, comprising:

a plurality of information communication devices to which at least one information device is connected;

tree shaped or star shaped bidirectional transmission lines for connecting said information communication devices; and at least one central information communication control device located upward of said bidirectional transmission lines, wherein said central information communication control device, includes, means for detecting an access state on upward transmission lines in said bidirectional transmission lines, and for generating access control information to control an access of said upward transmission lines by said information communication devices, and means for feed-backing said access control information to downward transmission lines in said bidirectional transmission lines toward said plurality of information communication devices, each of said plurality of information communication devices, includes, means for receiving said access control information feedback from said central information communication control device; and means for controlling said access of said upward transmission lines based on said access control information.

18. An information communication network system, comprising:

a plurality of information communication devices to which at least one information device is connected;

tree shaped or star shaped bidirectional transmission lines for connecting said information communication devices; and at least one central information communication control device located upward of said bidirectional transmission lines, wherein said central information communication control device, includes, means for monitoring and predicting an access state corresponding to existence of a carrier or a collision on upward transmission lines in said bidirectional transmission lines, and for generating access control information, and means for feed-backing said access control information to downward transmission lines in said bidirectional transmission lines and informing said plurality of information communication devices of said access state, each of said plurality of information communication devices, includes, means for receiving said access control information feedback from said central information communication control device, and means for synchronizing arrival of packet signals at said central information communication control device with a predetermined timing based on said access control information.

19. The information communication network system according to claim 18, wherein reception levels of said packet signals at said central information communication control device are substantially identical each other.

20. The information communication network system according to claim 18, wherein said packet signals include a signal for preventing the collision, said signal transmitted before transmission of an upward user packet.

* * * * *